US009996549B2

(12) United States Patent
Caso et al.

(10) Patent No.: US 9,996,549 B2
(45) Date of Patent: Jun. 12, 2018

(54) METHOD TO CONSTRUCT A FILE SYSTEM BASED ON AGGREGATED METADATA FROM DISPARATE SOURCES

(71) Applicant: Entangled Media Corp., Encinitas, CA (US)

(72) Inventors: Erik Caso, Encinitas, CA (US); Michael Abraham, Boulder, CO (US); Dan Clark, Boulder, CO (US); John Simmons, Boulder, CO (US)

(73) Assignee: Entangled Media Corp., Encinitas, CA (US)

( * ) Notice: Subject to any disclaimer, the term of this patent is extended or adjusted under 35 U.S.C. 154(b) by 402 days.

(21) Appl. No.: 14/663,804

(22) Filed: Mar. 20, 2015

(65) Prior Publication Data

US 2015/0269201 A1   Sep. 24, 2015

Related U.S. Application Data

(60) Provisional application No. 61/968,790, filed on Mar. 21, 2014.

(51) Int. Cl.
| | |
|---|---|
| *G06F 17/30* | (2006.01) |
| *G06F 11/14* | (2006.01) |
| *H04L 29/08* | (2006.01) |

(52) U.S. Cl.
CPC .... *G06F 17/30233* (2013.01); *G06F 11/1451* (2013.01); *H04L 29/0854* (2013.01)

(58) Field of Classification Search
CPC ......... G06F 17/30312; G06F 17/30864; G06F 17/30233
USPC .......................................................... 707/641
See application file for complete search history.

(56) References Cited

U.S. PATENT DOCUMENTS

| | | | | |
|---|---|---|---|---|
| 5,499,358 | A * | 3/1996 | Nevarez ............ | G06F 17/30067 707/802 |
| 7,440,994 | B2 * | 10/2008 | Harrow ............. | G06F 17/30206 707/E17.032 |
| 7,580,950 | B2 * | 8/2009 | Kavuri .................. | G06F 3/0605 707/669 |
| 8,572,169 | B2 * | 10/2013 | Partovi ................. | G06Q 10/10 709/204 |
| 8,972,334 | B2 * | 3/2015 | Castro ............... | G06F 17/30215 707/604 |
| 9,122,734 | B2 * | 9/2015 | Castro ............... | G06F 17/30215 707/604 |
| 9,844,303 | B2 * | 12/2017 | Jeong ........................ | F16H 1/46 707/704 |
| 2003/0105781 | A1 * | 6/2003 | Morris ................. | G11B 27/034 707/716 |

(Continued)

*Primary Examiner* — Shahid Alam
(74) *Attorney, Agent, or Firm* — Schwegman Lundberg & Woessner, P.A.

(57) ABSTRACT

A system and method for constructing a file system based on aggregated metadata from disparate sources is described. The system scans basic attributes of files in a file system, extended attributes of the files in the file system, and application-specific attributes of files that are managed by corresponding applications in the file system. The system generates an aggregate metadata library for the corresponding files based on the basic attributes, extended attributes, and application-specific attributes and builds a unified file system based on the aggregate metadata library.

18 Claims, 20 Drawing Sheets

(56) References Cited

U.S. PATENT DOCUMENTS

2010/0241659 A1\* 9/2010 Johnson ............ G06F 17/30038
 707/770
2012/0005159 A1\* 1/2012 Wang ................ G06F 17/30168
 707/617

\* cited by examiner

METHOD TO CONSTRUCT A FILE SYSTEM BASED ON AGGREGATED METADATA FROM DISPARATE SOURCES

RELATED APPLICATION

The present application claims priority to U.S. Provisional Application Ser. No. 61/968,790, filed Mar. 21, 2014, which is incorporated herein by reference in its entirety for all purposes.

TECHNICAL FIELD

The subject matter disclosed herein generally relates to the processing of data. Specifically, the present disclosure addresses systems and methods for a file system based on aggregated metadata from disparate sources.

BACKGROUND

Common data synchronization products generally fall into one of two types: locally installed software for file replication across devices and online backup/storage based file replication across devices. The local install file replication software is installed on computers and makes sure that all devices with the same software have the same data physically replicated on each device. Once configured by the user, it is able to identify updates to files on one device and update the corresponding files on other devices. These products or services essentially duplicate all designated data between the devices being synchronized. Each file stored on devices results in N duplicates of the same file.

The online backup/storage based file replication software is a blend of software that installed on local devices along with online storage. The process requires that all designated data is stored online and is then in turn replicated across all devices that are connected to the online storage server. These services duplicate all designated data between devices being synchronized, and store an additional copy on their servers. Each file stored on N devices results in N+1 duplicates of the same file.

Furthermore, identifying files from disparate sources across multiple devices may require the user to manually look for the correct path and the type of file corresponding to the type of search or request. For example, a user looking for a particular song may have to open the file system browser on every device of the user and browse through the multiple layers to access files in the corresponding folder (e.g., "my music" folder). Even if the user manages to identify the default music folder for music files, other music files may reside in other folder or may be stored in other parts of the file system.

BRIEF DESCRIPTION OF THE DRAWINGS

Some embodiments are illustrated by way of example and not limitation in the figures of the accompanying drawings.

DETAILED DESCRIPTION

Figure 1:
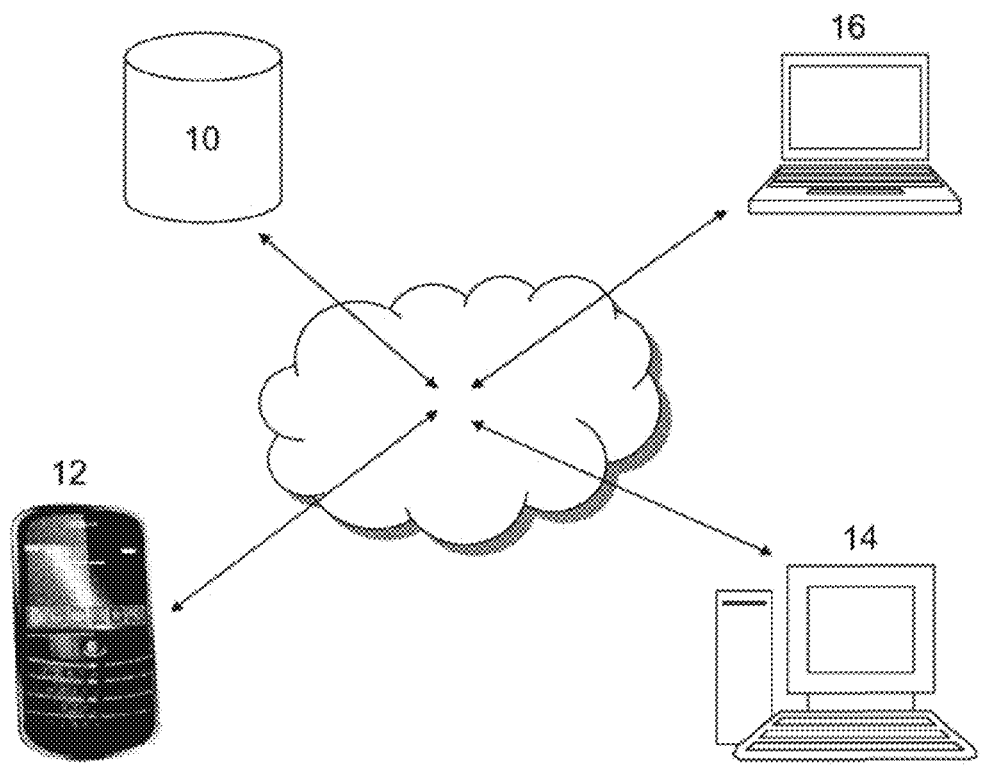
FIG. 1 is a block diagram according to an example embodiment of configuration of the components.

Example methods and systems are directed to a file system based on aggregated metadata from disparate sources. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The following words and phrases are used throughout this document and are attributed the definitions provided below for the purposes of describing the invention. One skilled in the art recognizes that there are obvious extensions to certain of these definitions and these are intended to fall within the scope of the listed definition, even if not explicitly reference therein.

Devices: Includes Internet-enabled devices that may be used for a variety of communications and data purposes, including document creation, media players, Internet browsing, etc. These devices may include desktop computers, laptop computers, netbooks, mobile Internet Devices, smartphone mobile handsets, gaming consoles, cable set-top boxes, televisions and other computing devices and telecommunications devices that are able to communicate using any form of data communications protocols such as TCP/IP, 30, CDMA, GSM, OSM, WiFi, WiMax, etc.

File System: Includes one or more components within an operating system responsible for managing all manner of files, as well as presenting them within a graphical user interface. The native file system of any given operating system has a set of standard file storage options, such as "My Documents" for documents, "My Music" for music, "My Pictures" for pictures, and so on. Local file systems allow for secondary file systems to be "mounted" and even accommodate the tracking of such file, but in all cases are managed separately. An example of this would be a USB thumb drive, which, when plugged into a computer, is mounted as a secondary storage location.

Local Device: Includes a device that a user (person) is currently using (e.g., they are in front of the device and actively using it).

Remote Device: Includes a device that the user (person) is not using; this device may be in another location and is only accessible via an Internet connection.

Disparate sources: Includes files from multiple devices (local and remote).

Software Client (or the Client): Includes a piece of software that is installed and runs continuously on the device.

Web Service: Includes a part of the system that operates on the Internet and is made up of several types of web technologies including web servers, databases, peer-to-peer services (e.g., jingle, BitTorrent, Skype, JXTA), an HTTP Relay and other systems that interact with the clients. The web service acts as an information manager that coordinates information, communication and activities with the clients. It also coordinates the transfer of files between devices by establishing a transfer protocol, such as peer-to-peer or HTTP relay, or other such method, depending on the type of connection that is available for a given network or Internet connection.

In one example embodiment, a system and method for constructing a file system based on aggregated metadata from disparate sources is described. The system scans and identifies basic attributes of files in a file system, extended attributes of the files in the file system, and application-specific attributes of files that are managed by corresponding applications in the file system.

Basic attributes may include operating system file system attributes. For example, the operating system file system attributes may include a file name, a file type, a file size, a file creation date, and a file path in the file system. Extended attributes may include file metadata. For example, the file metadata may include at least one of ID3 tag attributes, and EXIF attributes. The application-specific attributes of the files may include metadata generated by one or more applications in the file system.

The system generates an aggregated metadata library for the corresponding files based on the basic attributes, extended attributes, and application-specific attributes. The system then builds a unified file system based on the aggregate metadata library. The unified file system enables a user to browse through files located across multiple devices or within a single device. A unified file system application may operate within the unified file system to enable the user to query, search, or operate on files in the unified file system.

The unified file system application may receive a query or a request directed to the unified file system. For example, the query or request may include a search query, a rendering request, a file optimization request, or a share request. The unified file system application may identify one or more files from the unified file system based on the query and metadata from the aggregate metadata library and cause a display of the one or more files in a user interface of the unified file system application. In another example embodiment, the unified file system application accesses the identified one or more files with an application of the file system corresponding to the identified one or more files from the unified file system based on the aggregate metadata library. The unified file system application may store the aggregate metadata library in the storage device of the device, may communicate the aggregate metadata library to a second device having a second unified system application and a second aggregate metadata library, or may upload the aggregate metadata library to a server. The server may store the aggregate metadata library from the device, and other aggregate metadata library from other devices.

Referring to FIG. 1, an example system includes of a server 10 which hosts a web service and various user devices such as PDA 12, laptop computer 14 and desktop computer 16 with a particular software client installed thereon, to facilitate the virtual unification of data, including documents and media files, across all devices 12, 14 and 16 and constructing a file system based on aggregated metadata from files across devices 12, 14 and 16. The system facilitates transfer of data (e.g. files) on-demand between devices when requested. The devices 12, 14 and 16 are merely examples and can vary in their number, type, use and operating system/platform, ranging from mobile phones to desktop computers to gaming consoles or cable set-top boxes, each running a different operating system that uses a proprietary and different file system. In addition to user devices, the solution described herein can also incorporate files stored in an online service account, such as a photo account or video account (e.g., YouTube.com or Picasa.com). Additionally, although a single server is shown for illustration purposes, multiple servers, databases, processors may be used to implement the presently described system.

The system's method of data unification does not rely on file replication or cloning, but instead creates "virtual" file unification using a proprietary technique of differentiating local, physically stored data files versus remote data files and creating a unified, virtual representation of remote data on a local device. The system uses an operating-system extension, in conjunction with an intelligent web service, to determine the varying types of data that exist on each device that is a part of the system. The system differentiates data on a Local Device from data on a Remote Device and then communicates to each client what data is remote so that each client can create the virtual representation of the remote data within its local device file system. The client creates the virtual representation of all remote files using the same "path" or storage location on the remote device, resulting in a common, single view of all data across all devices that is consistent with the formatting and structure of the local file system.

In one example embodiment, the system may be transparent to the user, and does not require the user to interact with software, nor distinguish files in local vs. remote locations. All file metadata is integrated into the local device so that the view of data is common across all devices as if the files were actually stored locally across all devices, even though they are not. In essence, each device file system then acts as if it is a shared file system; enabling the local operating system to manage remote and local file as if they are all stored in the same location. For example, moving a file on one device results in the file moving on all other devices, even if it was moved on a device where that file is virtual.

In another example embodiment, the system may include a user interface of a file system application that is presented and displayed to the user. For example, a device may display and allow the user to discriminate a native file system from the unified file system. The user may interact with the unified file system to request, identify, or operate on files stored in the device or across other devices. In another example, the user may operate on files from a remote device on a local device. In another example embodiment, devices are connected to each other without the use of a web server. A configuration file information may be stored in each device.

Figure 2:
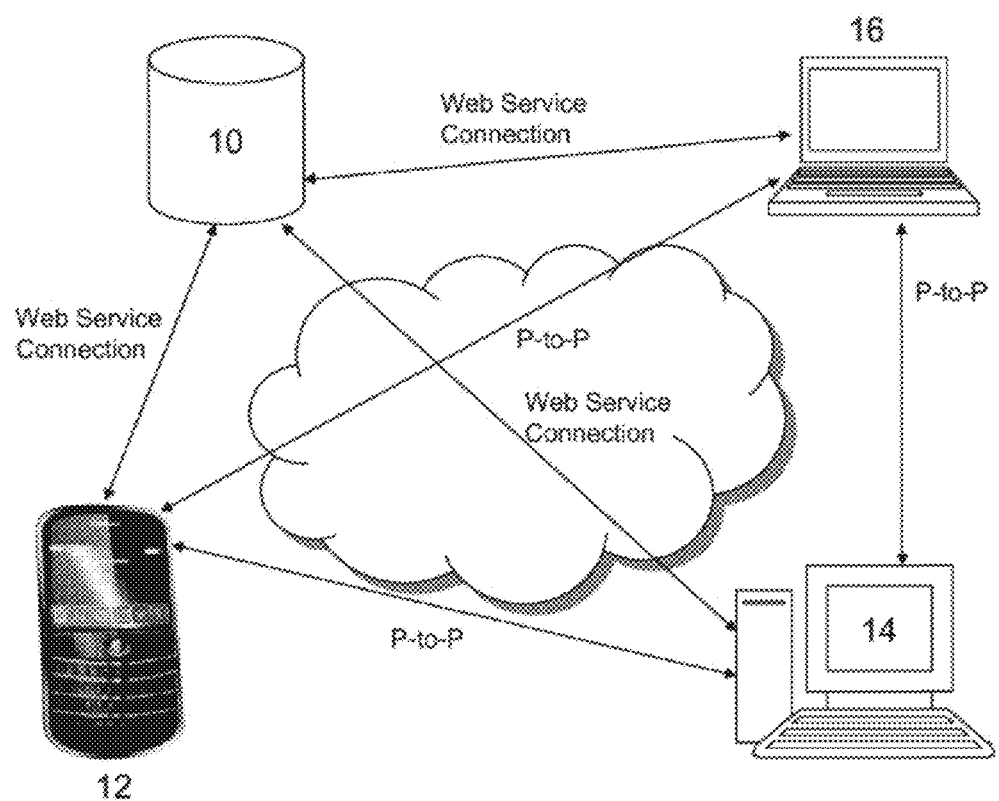
FIG. 2 is a schematic showing an example embodiment of configuration of FIG. 1 with communication paths therebetween.

FIG. 2 is a schematic showing an example embodiment of configuration of FIG. 1 with communication paths therebetween constituting a user's closed data virtualization system in accordance with the descriptions herein. In the example embodiments described herein, the software clients recognize and account for differences in file structures and nomenclature. For example, documents stored in the "Documents" folder of a user's registered Mac would show up in the "My Documents" folder of a Windows system registered to the same user. The software client and web service perform a logical mapping between available desktop platforms, e.g., Windows, Mac, Linux.

Devices 12, 14, and 16 may each connect to the server 10 via respective web service connection and provide to the server 10 peer connection information. The server 10 makes that connection information available to those devices, and those devices then determine what types of connections are possible between them regarding communication protocol and parameters to be used for the transfer. For example, device 14 determines if a peer-to-peer connection is available between devices 14 and 16. If that peer to peer (p-to-p) connection is possible, device 14 exchanges file metadata directly to device 16. In instances where a p-to-p connection is not possible (e.g., due to firewall restrictions), the server 10 acts as an HTTP relay server.

Figure 3:
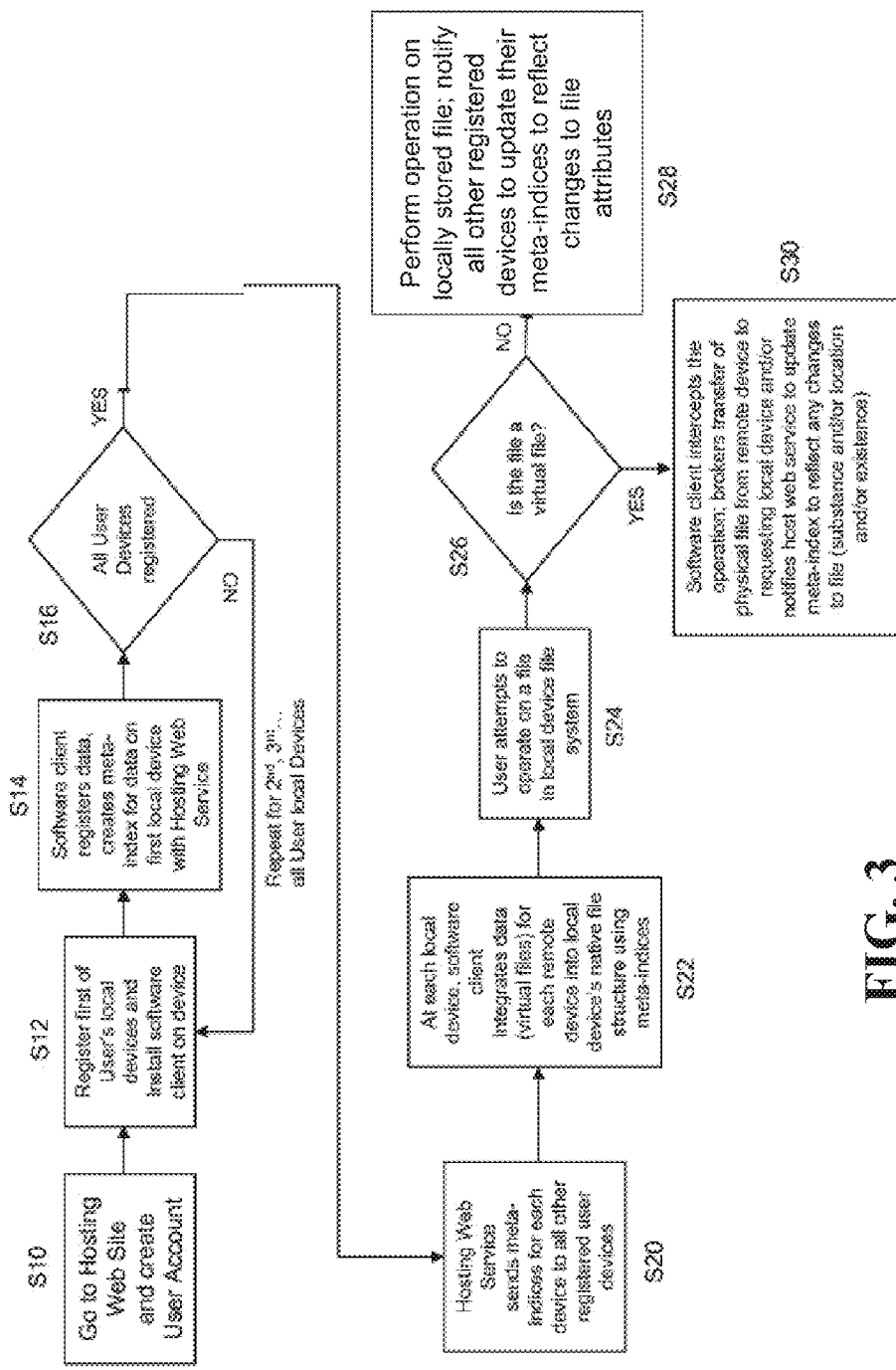
FIG. 3 is a device registration and data virtualization process flow in accordance with an example embodiment.

FIG. 3 is a device registration and data virtualization process flow in accordance with an example embodiment. For example, FIG. 3 illustrates a detailed overview of a first example process from user sign-up to virtual file access across devices. In S10, access to the system may be accomplished via creation of a user account with the provider of the service. Registration information may include user name, e-mail address and other required personal information as well as creation of user name and password to facilitate establishing and securing a user account. In another example embodiment, the user may create his own account without having to sign-up with a service provider. Thus, the user can use login password to access devices under a same account.

Once an account has been created, the user can install the required software client on each of their individual devices and initiate the process of registering each device with the service provider S12. As part of the registration process, for each individual user device, the user names the device, e.g., laptop, desktop, smartphone, and selects the type or category of data, e.g., documents (e.g., text), pictures (e.g., .jpg, .img), audio (e.g., MP3), video (e.g., .dvi, files.mov files) available on the device that the user wishes to virtually unify across multiple devices. In one example embodiment, all categories are automatically selected. Alternatively, this selection may be accomplished by a drop down menu listing file types, categories, extensions, etc. For online service accounts, the user may register these accounts and may provide appropriate log-in information (e.g., username and password). As described below, once this selection is made, the installed software client then scans and inventories the selected data into a meta-index of the file system and reports back to the web service (e.g., web service provided by server 10) on that selected data S14 in order to create a singular file system based on said metadata that is shared among all devices in the user's account. Alternatively, once the software client is installed on the user device, it could automatically scan and inventory all the data available on the user device and report back to the service provider.

The software client provides user device data in the form of a meta-index. For each identified data file, the meta-index includes metadata such as file name, file type, file size, local path the file is stored in, date created, date modified, etc. Once all of the user's devices and on-line service accounts are registered and meta-indexed by the software client S16 (or the service provider in the case of the on-line service accounts by interacting through the respective application programming interfaces (APIs) of the on-line services to obtain data information), the web service propagates those indices to each registered device, allowing each registered device to construct a unified index of all of the individual meta-indices for all of the user's registered devices into a database. This master index of metadata (also referred to as aggregated or unified metadata) thus becomes the singular file system that all devices use. As described later, the master index of metadata may be integrated locally into a device's operating system via the software client.

The web service allows propagation of meta-indices for each of the registered devices to each of the other individual registered user devices S20. At each registered local device, the software client integrates metadata from the remote device indices into the local device's file system S22. The metadata instructs the software client where to store the data files, ensuring that a common view and storage location is maintained across all devices. At this point, the local operating system's file system has been modified to include remote files in the same locations of the local device (such as the "My Documents" folder) as opposed to a separate and segregated location for such remote data (such as a synchronization folder or an additional hard drive "mounted" on the device).

In another example embodiment, the software client may facilitate the creation of a visual representation of the remote or virtual files on the local device, as if the files were indeed local, allowing the user to operate on them as if they were local to the device. The virtual files appear in essentially all ways the same as a local file, making them indistinguishable unless such a distinction is enabled as a separate option. Lastly, if a unique folder or directory exists on one device (e.g. within the My Documents folder) and has several files within it, that folder/directory is created on all other devices so that its files may be put within said folder/directory, ultimately representing the same path to all corresponding files.

Using their local device, the user attempts to operate on a file S24. If the file is a local file, physically located on the local device, the operation is performed on the local file and the software client notifies all other registered devices to update their meta-indices to reflect any changes to the attributes of the file, e.g., substantive, location or existence thereof S26, S28. If the user attempts an operation on a virtual file that is physically stored on a remote device, the software client intercepts the operation request and, if the file is to being opened or executed, the software client brokers a connection between the remote device containing the physical file and the local device requesting the file S30. The file is then transferred from the remote device to the local device and the operation is performed on the file at the local device. As in S28, details regarding the location, status, and existence of the file are provided to the web service by the local software client which allows all other devices being unified to be continuously made aware of the changes in the location or existence of the file S30. Once the file has been transferred from the remote device to the local device, it can be viewed, edited, or modified in any way by the user. Upon completion of any modification to the file, all changes are propagated back to the remote device and the local file is restored to its 'virtual' state. At this point the local device removes the aforementioned file from memory, so that it is stored only in the single location/device on which it was originally kept. Additionally, the aforementioned file's metadata is updated (such as "date last modified") and propagated to all other devices. The method of file transfer may vary, initially attempted via peer-to-peer methodology. Under certain circumstances, a peer-to-peer connection might be prohibited from occurring, at which point the web service will itself manage the connection (via HTTP Relay) between devices to ensure communication can always occur.

Alternatively, for virtual files located with an on-line service provider, when the user attempts to operate thereon from a local device file system, a browser window is opened within the on-line service to facilitate operation.

Figure 4:
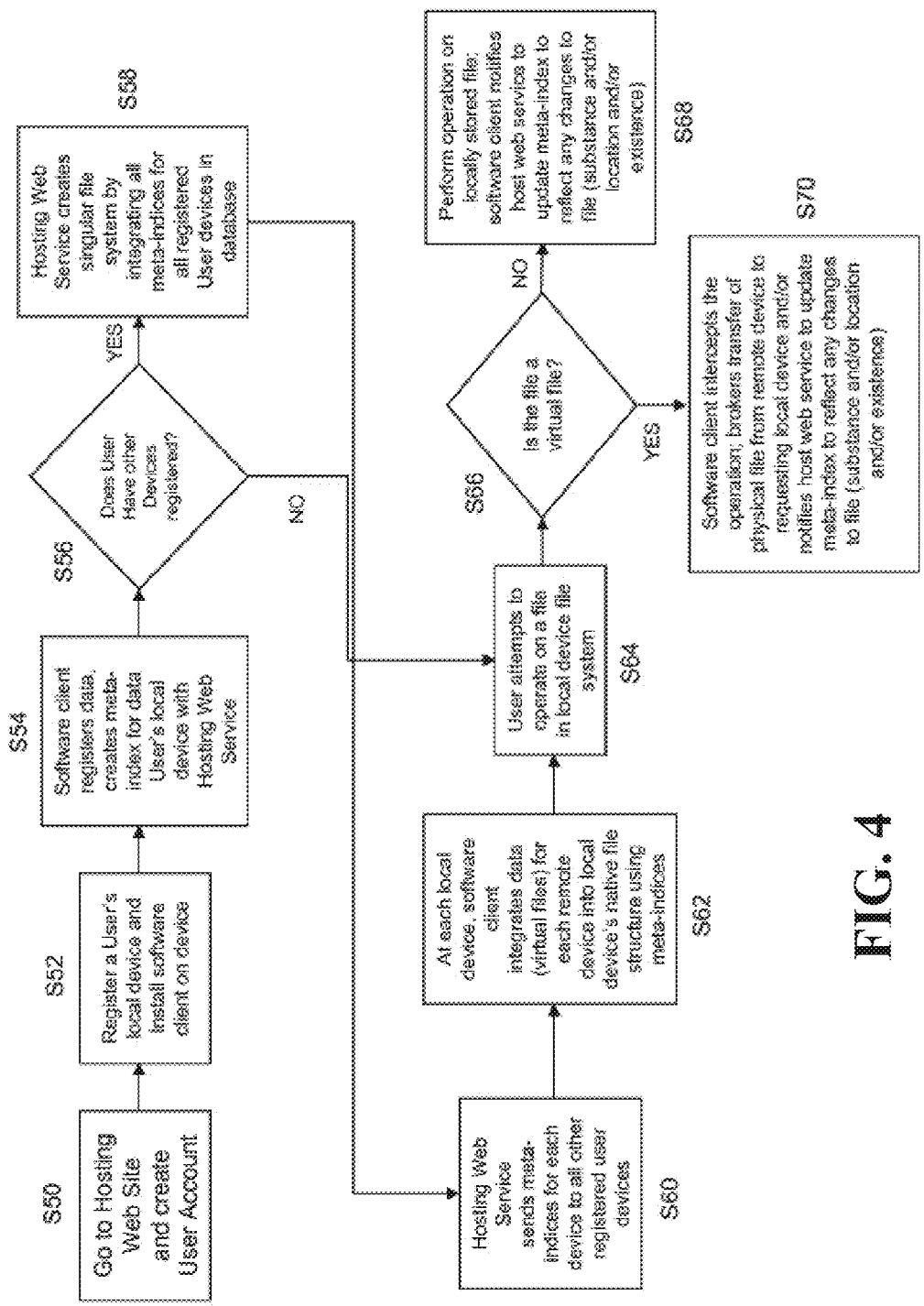
FIG. 4 is a device registration and data virtualization process flow in accordance with an example embodiment.

FIG. 4 illustrates an alternative example process flow. In this flow, which is similar to the process flow from FIG. 3, this flow illustrates the process flow wherein there is only a single registered user device and devices are added sequentially. After creating an account S50, the user registers a device S52 and the downloaded software client creates a meta-index for the device data and stores in the web service database S54. If the user has no other registered devices ("NO" to S56), when the user performs operations on device files S64, the answer to the question "Is the file a virtual file?" S66, will always be "NO" and the software client will report local file changes to the web service S68. If the user does have other registered devices ("YES" to S56), the process S58-S70 follows the same flow as steps S20-S30 in FIG. 3.

Accordingly, if a user has a desktop computer and laptop computer and a smartphone, the processes described herein essentially unify the data across those devices once they are registered them with the web service. The user can add and remove devices associated with their customer account at their convenience. The data that is unified across the devices correlates specifically to what devices the user adds to their customer account.

The embodiments described herein create a single unified file system that is shared across multiple devices a user might own. The software client provided by the web service to facilitate this unification is downloaded to a user's individual devices as described above. The software client may be provided in the form of an operating system extension, or 'plug-in' that is unique to the type of device/operating system which is established at the time of registration. The plug-in modifies the natural behavior of the operating systems of the individual registered devices in a way that, as it pertains to remote files, prevents the operating system from doing what it normally does. This may be akin to rewriting the behavior of the operating system itself and how it treats files and, thus, runs in a mode that is the operating system. This is different from software that runs in a mode that is secondary to the operating system's operations. The software client is responsible for at least: indexing the device data in a meta-index in accordance with user selection of data types; providing the meta-index for its device to the web service; receiving meta-index information for all other registered devices on the user's account; creating virtual files in the file system of its device in the file system format of its device; updating the file system of its device to reflect changes to all virtual (remote) files in accordance with meta index changes provided by the web service; informing the web service of changes to local files; facilitating communications between its device and other registered devices to retrieve remote files for operation on the local device.

The virtual files appear to the user exactly as local files. For example, each virtual file includes a thumb nail with an icon, it would have the file name, the file size, the file type, the date it was created, the date it was modified, all that the physical file has except that it doesn't take any space on the local device with the exception of the space required for meta-data storage (less than 1 kilobyte per file). The virtual files act as mock files and mock the properties of the physical file. By way of example, if the physical file of File.DOCPHY is located on the hard drive of Device A, a virtual file of File.DOCVIR will be located in the same corresponding file directory of the hard drive on registered Device B and Device C. When the user moves File.DOCPHY from its stored directory (e.g . . . /My Documents/ Proposals) on the hard drive of Device A to the desktop directory of Device A, this move will be indexed by the software client of Device A (provided to the web service). The user meta-index database at the web service is updated to reflect the move. The software clients of Devices B and C are notified of the move and the software clients of Devices B and C are updated. Devices B and C, respectively, show File.DOCviR on the desktops (or equivalent locations) thereof. Conversely, if the same actions were performed on a virtual file, instead of the physical file, the same corresponding routines and results would occur, thus ensuring that regardless of a user interacting with the physical or virtual version of a file, they are treated as if they were the same.

Figure 5:
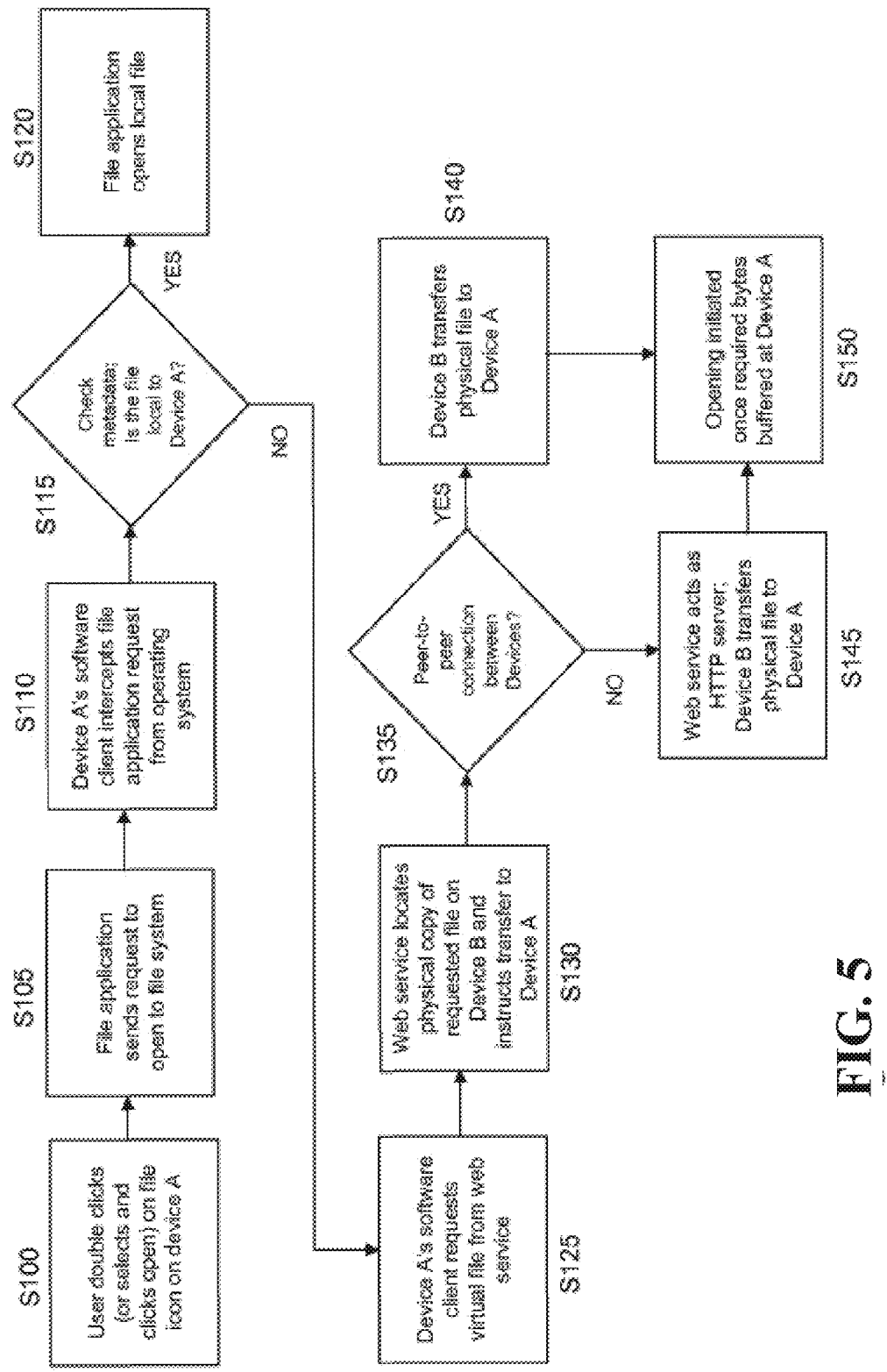
FIG. 5 is a file retrieval process flow in accordance with an with an example embodiment.

The software client described herein acts as an operating system plug-in to intercept calls made to files and programs in the file system of the respective user devices. An example description of software client functionality responsive to calls to the file system is described below and illustrated in FIG. 5. When the user attempts to open a file on their local Device A S100, the application associated with the file, for example, Adobe Reader in the case of a .pdf file, talks to the file system and requests that the selected .pdf file be opened for read access S105. The software client intercepts this request from the operating system S110 and checks its metadata to determine whether the selected file is a local file or a virtual file (remote file) S115.

In the case of a local file, there is no action required by the software client and the file system returns the command to the operating system to open the file S120. In the case of a virtual file, the software client on Device A determines from the file's metadata the remote device on which it is stored (Device B) and asks the web service to broker a connection between Device A and Device B S125. The web service propagate peer address information to each peer device and the peer devices determine what type of connection is possible between Device A and Device B such as communication protocol and parameters to be used for the transfer. Initially, the web service determines if a peer-to-peer connection is available S135. If that peer to peer (p-to-p) connection is possible, Device B sends the physical file directly to Device A for operation on Device A S140. In instances where a p-to-p connection is not possible, e.g., due to firewall restrictions, the web service acts as an HTTP relay server S145. During the time that the request to Device B for the file transfer to Device A is happening, the operating system, and in turn the requesting application (Adobe Reader) has no idea that the requested file is not local to Device A and is simply waiting for that command to return the number of bytes that it requested so that it can display them. The software clients, in combination with the web service, transparently perform numerous commands to request, locate and retrieve a physical copy of the virtual file without the knowledge of the requesting application or operating system. Further, the entirety of the physical file need not be downloaded in order to be responsive to most actions, so, just as with streaming video, the underlying transfer continues while the user action is taking place with the initial buffer of required bytes (e.g., approximately 32 kilobytes per read operation in the case Adobe Reader running on Mac OS X) S150.

Figure 6:
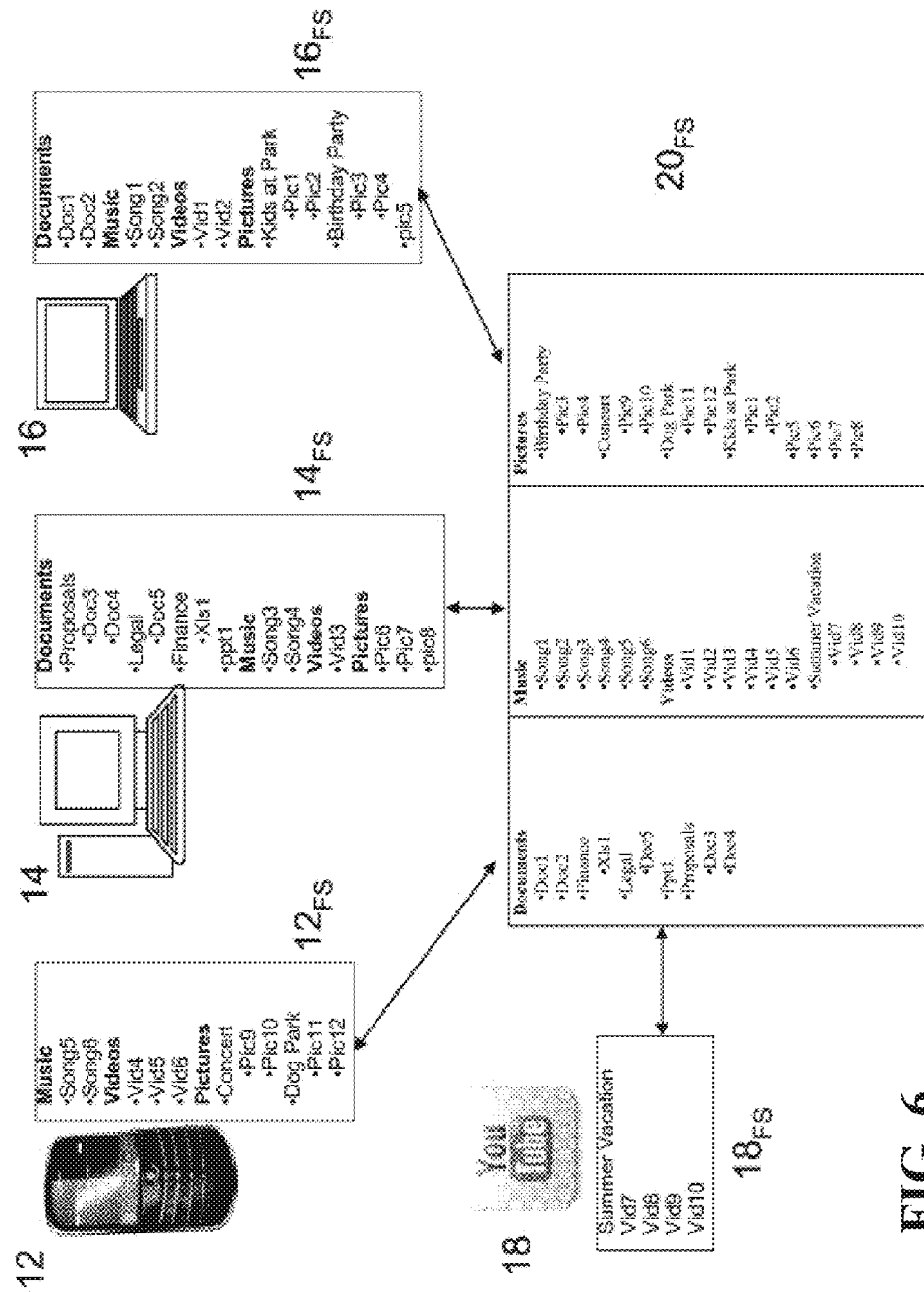
FIG. 6 illustrates an example of a unified file structure scenario.

FIG. 6 illustrates an example unified file structure $20_{FS}$ created from the individual device file structures $12_{FS}$, $14_{FS}$ and $16_{FS}$ and on-line service file structure $18_{FS}$ in accordance with the methods described herein. This unified file structure $20_{FS}$ will replace file structures $12_{FS}$, $14_{FS}$ and $16_{FS}$ in devices 12, 14 and 16. The file structure of on-line service 18 is not be unified.

Other than mapping between the 'canonical' elements of the file system, the software does not interfere with the user's choice of file locations. For example, if a registered user chooses to store music files in their Windows 'Desktop' folder, rather than under their 'My Music' folder, as is the convention, the software will respect their choice and make those files appear under the 'Desktop' folder of their other registered devices. Furthermore, the system is able to create unique directories on the device in order to maintain the appropriate path for a given file (in the case where a user manages their file system to have a naming system for how they store their files). In the specific cases where two devices each have a different file but with the same path, the system will employ a process for resolution. For example, the system may use a naming convention to resolve the collision and show both files on each device. For example, if there are two registered devices called 'Mac' and 'Windows', and a file called 'resume.doc' under 'Desktop' in both devices, the system creates two separate files on each device. On 'Mac', a local file called 'resume.doc' and a remote file called 'resume (Windows).doc' which is a virtual file on the local 'resume.doc' located on the 'Windows' device. On 'Windows', a local file called 'resume.doc' and a remote file called 'resume (Mac).doc which is a virtual file on the local 'resume.doc' located on the 'Mac' device. One skilled in the art recognizes that other methodologies may be employed to resolve collisions in a transparent and completely automatic manner.

For certain devices, the logical mapping is not as readily accomplished as it is with established operating systems such as Mac, Windows, and Linux. For example, while numerous mobile devices, gaming consoles, cable set top boxes, televisions and other computing devices and telecommunications devices can certainly store documents, pictures, video, music and the like, the operating systems, file structures and interfaces vary significantly from one another and from the established personal computer systems. Accordingly, when a user registers mobile devices such as the iPhone, Droid or other smart phones, the listing of virtual files in an established file directory may not be feasible. Accordingly, such devices may store all virtual files in an application that is downloaded as part of the software client. When a user wishes to access content that is physically stored on a different device, the user would search for the file in the dedicated software client application.

Figure 7:
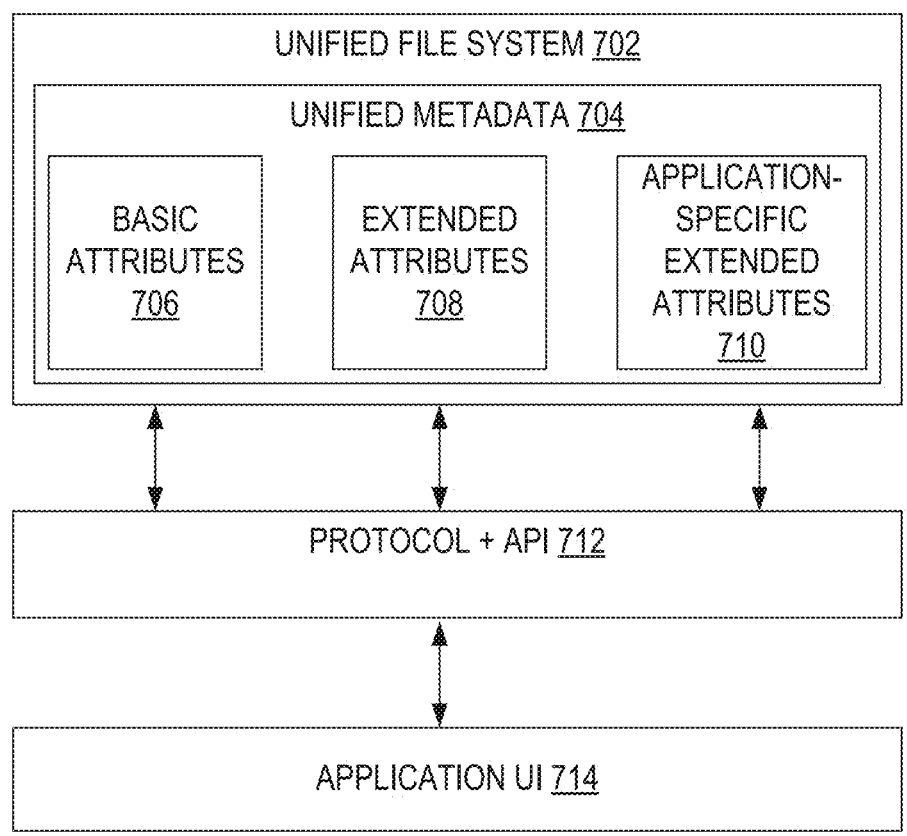
FIG. 7 is a block diagram illustrating an example embodiment of a system comprising a unified file system based on aggregated metadata from disparate sources.

FIG. 7 is a block diagram illustrating an example embodiment of constructing a unified file system based on aggregated metadata from disparate sources. A singular, unified file system 702 is built from multiple devices, which it does by generating unified metadata 704 about content/files from multiple sources (e.g., files from multiples devices). The initial source may be the native operating system file system, which is primarily basic attributes 706 such as file name, file type (e.g. extension, such as .doc or .pdf), file size, path, dates, etc. In one example embodiment, the basic attributes 706 include OS file system metadata which includes basic metadata for file systems to be managed, and has minimal information for the file system to organize information and function properly. While the unified metadata 704 of the unified file system 702 incorporates the basic attributes 706, the unified file system 702 may also incorporate two additional methods to build out its file system as described below.

Once all the files have been discovered in the first stage of the file scan (via parsing of basic attributes described above), the unified file system 702 then scans and parses out file-specific metadata for all types of files that may have such extended attributes 708. Examples of extended attributes 708 may include ID3 tags for audio and video files, and EXIF data for photo and image files. These extended attributes 708 may be embedded in the corresponding files and often provide far more detailed information about the nature of a file and its content. For example, with audio files, additional information in the extended attributes 708 may include the artist of a song, the album the song is on, the release date of the album, which song on the album it is and how many songs there are in total. For photos, additional information in the extended attributes 708 may include the make and model of the camera the photo was shot with, the shutter speed and aperture, white balance, whether the flash was on, and if the camera has a GPS tagger it might include the geolocation data of where the photo was shot.

In another example embodiment, the presently described unified file system 702 may additionally parse out application-specific extended attributes 710 (e.g., additional extended attributes for all file libraries that are managed within applications). Many files are not at all managed within the standard file system of an operating system, instead they are managed via an application that is dedicated to a given file or media type. For example, documents might simply be put into directories within the basic file system of an operating system; however, music might be managed within a media player, such as Apple's iTunes and photos might be managed within a photo management application like Adobe's Lightroom. In each such case, a variety of application-specific metadata (included in the application-specific extended attributes 710) is generated by such applications in order to organize and manipulate the files. Examples of this might be photos being put into a photo "album", songs being put into a playlist. In many cases, these applications allow files to be rated, indicating which ones are preferred by the user over others.

By building the unified file system 702 to include these additional sources of information/metadata (from basic attributes 706, extended attributes 708, and application-specific extended attributes 710), the unified metadata 704 is vastly more information-rich than a standard, file system built only from basic attributes. For example, this enables the unified file system 702 to search not only for files across a variety of stored locations and devices (e.g. computers, external hard drives, online services, etc.), but also for detail within those files. Such a search would be traditionally performed by using separate tools (e.g. the operating system to see where on the hard drive a file is, an ID3 tag editor to reveal ID3 tags, iTunes for playlists, Lightroom for EXIF data, etc.) and not the basic search capabilities of the native file system's search functionality. Thus, the unified file system 702 incorporates both native operating system, third party software, and application library searching all from within a single platform. Furthermore, a user interface of the unified file system 702 may build views based on file metadata and application-specific metadata, and also dynamic views by unifying, for example, music that is not in iTunes (which only has ID3 tags) with music in iTunes (which has an iTunes library).

This method of creating a file system also enables the unified file system 702 to organize and render the files dynamically within the user interface of a unified file system application. This means that, in addition to showing files based on the path of where they are stored on the hard drive, the unified file system 702 is able to dynamically organize content based on the unified metadata 704. The unified file system 702 merges the user interface capabilities of the operating system and applications such as iTunes and Lightroom. Traditionally, the operating system typically allow users to browse a hierarchical directory structure to where the directory where a music album is stored. An application such as iTunes allows users to instead browse by the name of an album directly. In contrast, the presently described unified file system 702 incorporates both of these natively because the unified file system 702 dynamically organizes this content without the user having to create an application-based library within iTunes or another media player. A user an application of the presently described unified file system 702 can choose how to view their content within a single file system, based on what is the most convenient method for their purposes.

The protocol and API 712 enable access this information-rich file system (e.g., unified metadata 704) to identify content and operate on the content. Once the unified file system 702 is built, the unified file system 702 can also enable operations on the content. For example, the operation may include a query to describe or organize (render) information for display based on files associated with the unified metadata 704. In another example, the operation may include transforming content (e.g. a music file or video) into another format appropriate for the device or another device (e.g. transcode large file to smaller file, transcode file to be compatible with OS playback). The protocol and API 712 further enables third party applications to communicate with other devices to get content.

Figure 8A:
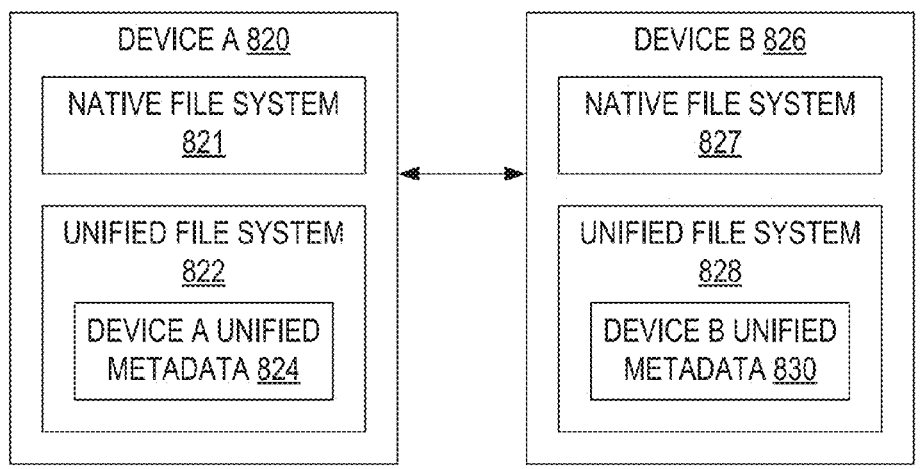
FIG. 8A is a block diagram illustrating an example embodiment of storing unified metadata in a first and a second device.

FIG. 8A is a block diagram illustrating an example embodiment of storing unified metadata in a first and second device. A device 820 includes a unified file system 822 that is built based on files and applications from a native file system 821 of device 820 as previously described with respect to FIG. 7. The unified file system 822 may include unified metadata 824 corresponding to device 820. The device 820 may be a computer communicating with another device 826. Similarly, device 826 includes a unified file system 828 that is built based on files and applications from a native file system 827 of device 826. The unified file system 828 may include unified metadata 830 corresponding to device 826. Therefore, each device stores its own respective unified metadata. In one example embodiment, when device 820 queries for a file from device 826, unified file system 822 queries the unified metadata 830.

Figure 8B:
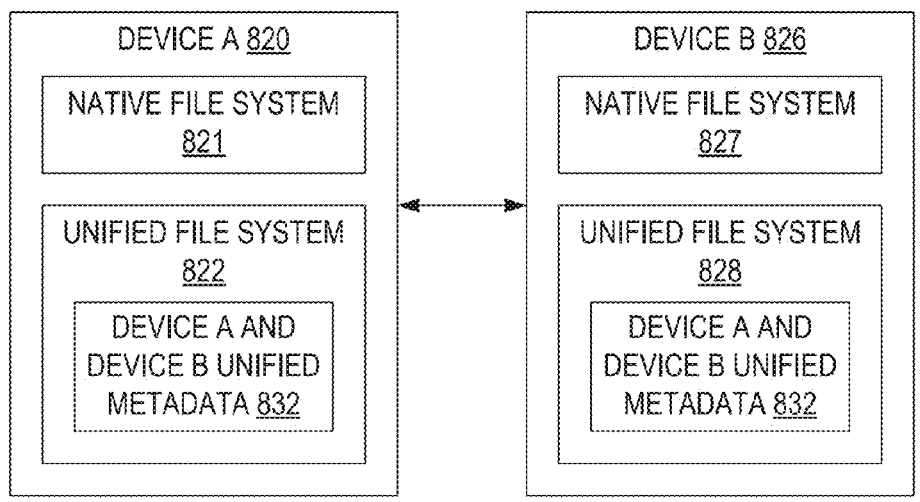
FIG. 8B is a block diagram illustrating another example embodiment of constructing a file system based on aggregated metadata from disparate sources.

FIG. 8B is a block diagram illustrating another example embodiment of constructing a file system based on aggregated metadata from disparate sources; The device 820 includes unified file system 822 that is built based on files and applications from both native file system 821 of device 820 and native file system 827 of device 826. Therefore, in addition to unified metadata corresponding to files and applications from native file system 821, the unified file system 822 includes unified metadata corresponding to device 826. Thus, unified file system 822 include unified metadata 832 corresponding to both devices 820 and 826. Similarly, unified file system 828 of device 826 includes unified metadata 832. Each device includes unified metadata from other related devices. In one example embodiment, device 820 may query a file from both devices 820 and 826 by querying the unified metadata 832 in device 820. Device 820 does not need to send a query to device 826 and wait for a response to the query.

In one example embodiment, device 820 pulls unified metadata 830 from device 826 on a regular basis (e.g., every day), or based on updates to index-metadata in the unified file structure $20_{FS}$ illustrated in FIG. 6. In another example embodiment, device 820 pushes unified metadata 824 to device 826 on a regular basis, or based on updates to index-metadata in the unified file structure $20_{FS}$ illustrated in FIG. 6.

Figure 8C:
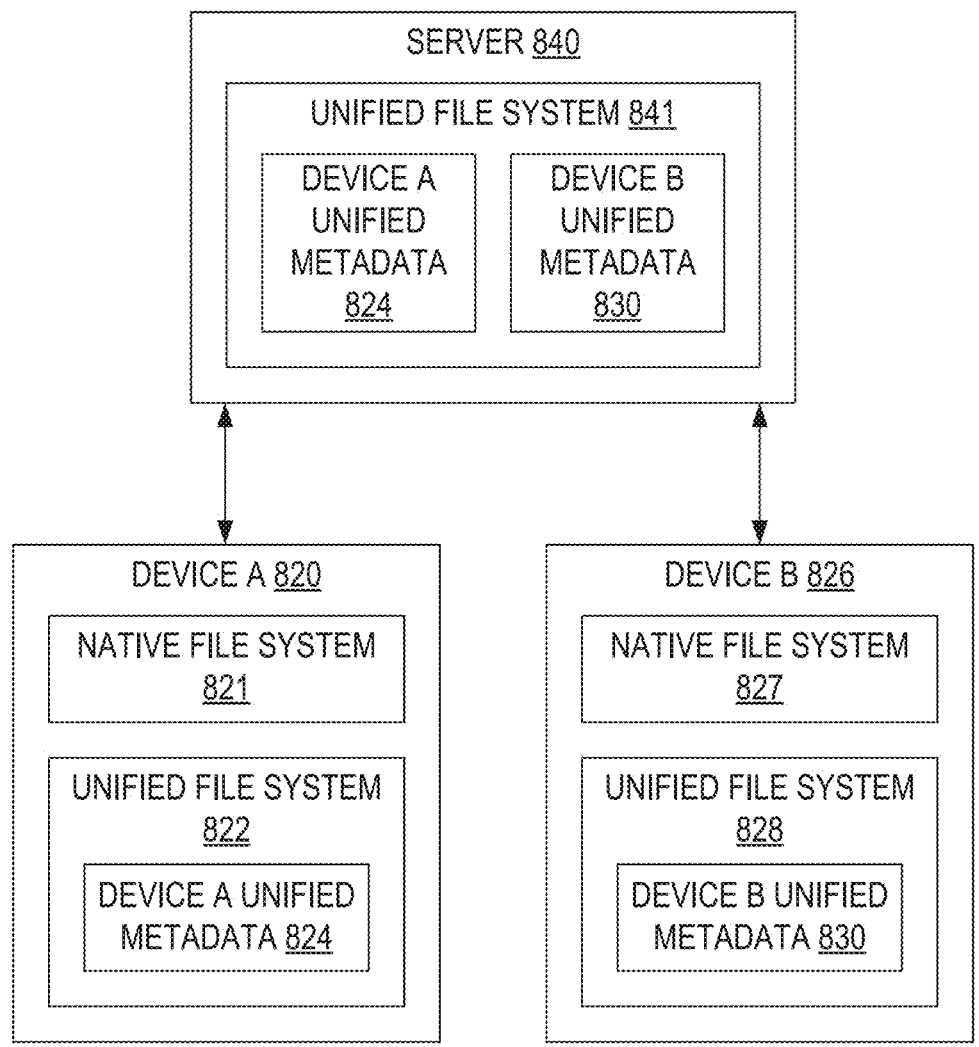
FIG. 8C is a block diagram illustrating an example embodiment of storing aggregated metadata from disparate sources in a server.

FIG. 8C is a block diagram illustrating an example embodiment of storing aggregated metadata from disparate sources in a server 840. The server 840 includes a unified file system 841 that includes unified metadata 824 from device 820 and unified metadata 830 from device 826. Device 820 uploads its unified metadata 824 to server 840. Device 826 uploads its unified metadata 830 to server 840. When a user queries for a file using the unified file system 822 at device 820, the unified file system 822 generates a query against unified metadata stored at the server 840. The unified metadata in server 840 may be associated with unified metadata from disparate devices associated with a single user account.

Figure 9:
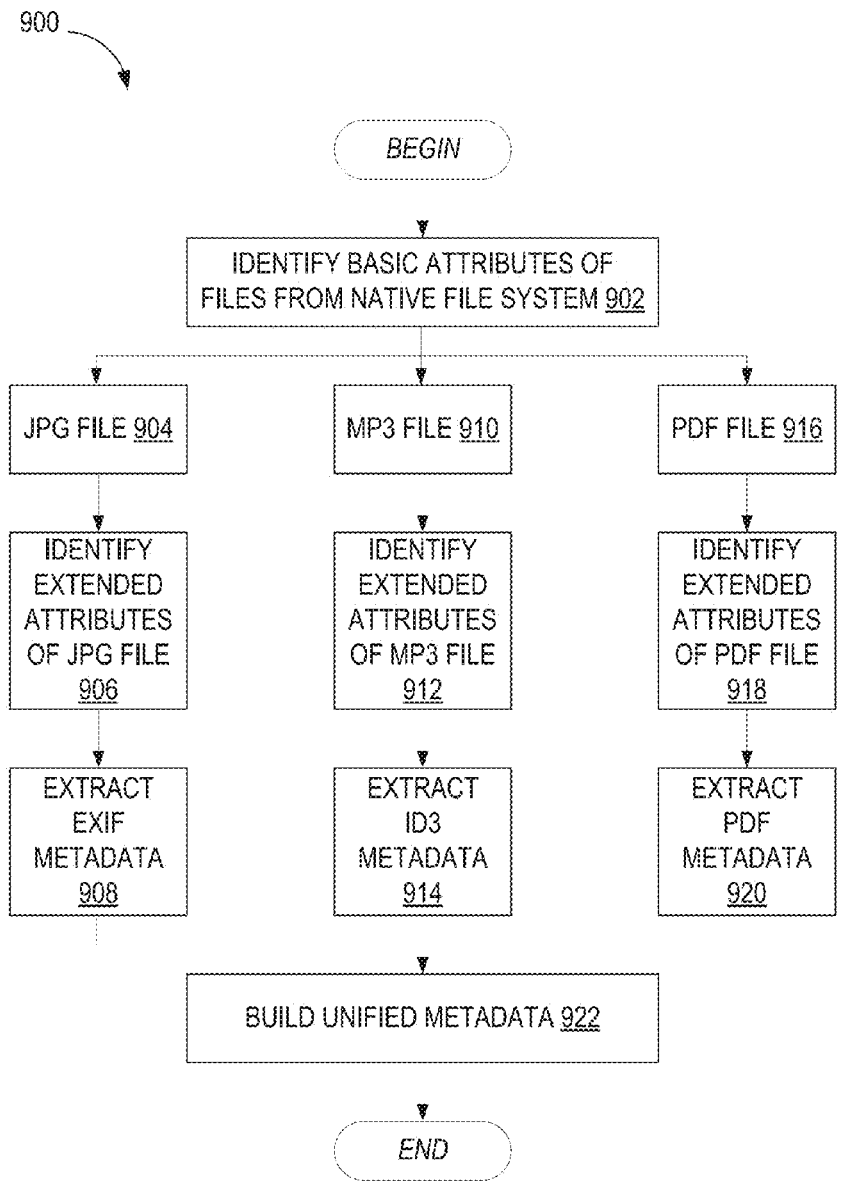
FIG. 9 is a flow diagram of an example embodiment of a method for building unified metadata based on aggregated metadata from disparate sources.

FIG. 9 is a flow diagram of an example embodiment of a method for building unified metadata based on aggregated metadata from disparate sources. Upon installation of a unified file system application as previously described with respect to FIGS. 3-5, the unified file system application scans the native OS file system of a corresponding device to discover all the files on that device. In another example, the unified file system application scans the native OS file system of other devices. As the unified file system application discovers files, it extracts the basic attributes, at operation 902, that the native file system is built from: file name; file type; size; date created/modified/last accessed; path; etc.

Once the unified file system application knows about all the files from the native file system, it proceeds to mine each file for file specific metadata based on the basic attributes (e.g., extended attributes) extracted at operation 902. The method of metadata extraction differs based on the type of file. FIG. 9 illustrates examples of metadata extraction for different types of files.

In a first example at 904, the unified file system application identifies that a file in the native file system is an image file based on its basic attribute (e.g., file extension is .jpg). Now that the unified file system application knows that the file is an image file, it identifies extended attributes related to the image file at 906. Examples of extended attributes for a jpg file include EXIF metadata (e.g., camera model, camera manufacturer, resolution, exposition, data and time, aperture). These extended attributes are inherently a part of the file themselves. At 908, the unified file system application extracts the extended attributes (e.g., EXIF metadata) from the image file.

In a second example at 910, the unified file system application identifies that a file in the native file system is an audio file based on its basic attribute (e.g., file extension is .mp3). Now that the unified file system application knows that the file is an audio file, it identifies extended attributes related to the audio file at 912. Examples of extended attributes for a mp3 file include ID3 tags or metadata (e.g., title, artist, album, year, track, genre). At 912, the unified file system application extracts the extended attributes (e.g., ID3 metadata) from the audio file.

In a third example at 916, the unified file system application identifies that a file in the native file system is a document based on its basic attribute (e.g., file extension is .pdf). Now that the unified file system application knows that the file is a pdf file, it identifies extended attributes related to the pdf file at 918. Examples of extended attributes for a pdf file include metadata about the document and its content (e.g., author's name, keywords, document properties). At 920, the unified file system application extracts the extended attributes (e.g., pdf metadata) from the pdf file.

The unified file system application builds unified metadata based on the extracted metadata from operations 908, 914, and 920. The unified file system may be based on the unified metadata.

Figure 10:
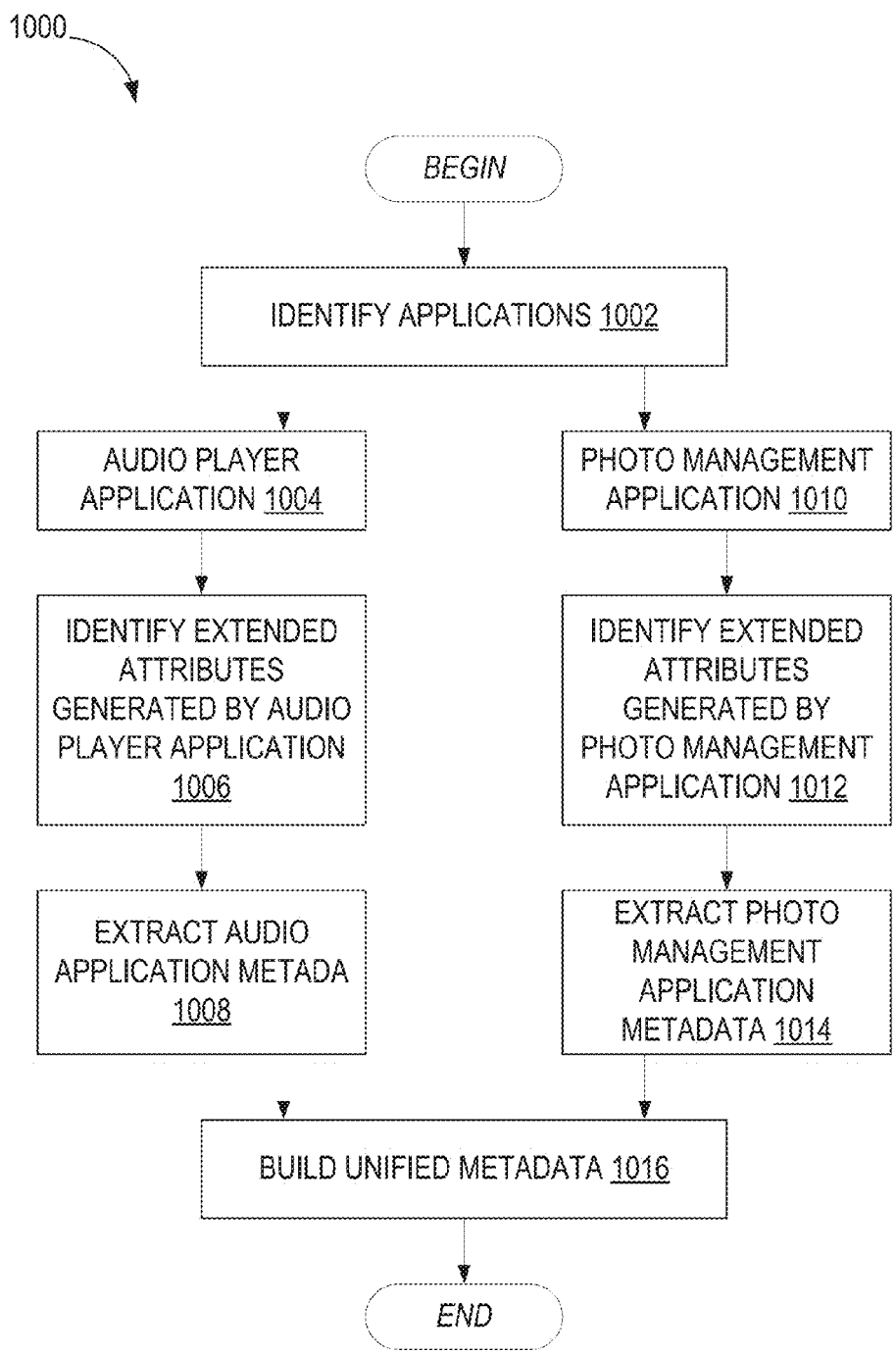
FIG. 10 is a flow diagram of an example embodiment of a method for building unified metadata based on application-based aggregated metadata from disparate sources.

FIG. 10 is a flow diagram of an example embodiment of a method for building unified metadata based on application-based aggregated metadata from disparate sources. The unified file system application can also scan applications on the computer to identify extended attributes that those applications have created for the same, corresponding files. Each application can create different types of extended attributes and multiple applications can create extended attributes for the same file(s). These attributes are stored in the applications themselves (e.g. configuration files, databases, etc.) FIG. 10 illustrates examples of metadata extraction for different types of applications. The unified file system application identifies an application at operation 1002 on one or more devices identified under a same user account.

In a first example at 1004, the unified file system application identifies that an application is an audio player application (e.g., mp3 player). Now that the unified file system application knows that the application is an audio player application, it looks for extended attributes generated by the audio player application at 1006. Examples of extended attributes for an audio player include ratings for songs, songs in playlists, user modified genres for music, and movie poster artwork. These application-based extended attributes may be inherently a part of the application themselves. At 1008, the unified file system application extracts the application-based extended attributes from the audio player application (e.g., configuration file of the audio player application).

In a second example at 1010, the unified file system application identifies that a photo management application. Now that the unified file system application knows that the application is a photo management application, it looks for extended attributes generated by the photo management application at 1012. Examples of extended attributes for a photo management application include facial recognition tags that identify people in a photo, and photo album names. At 1008, the unified file system application extracts the application-based extended attributes from the photo management application (e.g., configuration file of the photo management player application).

The unified file system application builds unified metadata based on the application-based extracted metadata from operations 1008 and 1014. The unified file system may be based on the unified metadata. In one example embodiment, the unified file system application builds unified metadata based on the extracted metadata from extended attributes from operations 908, 914, and 920 and application-based extracted metadata from operations 1008 and 1014.

Figure 11:
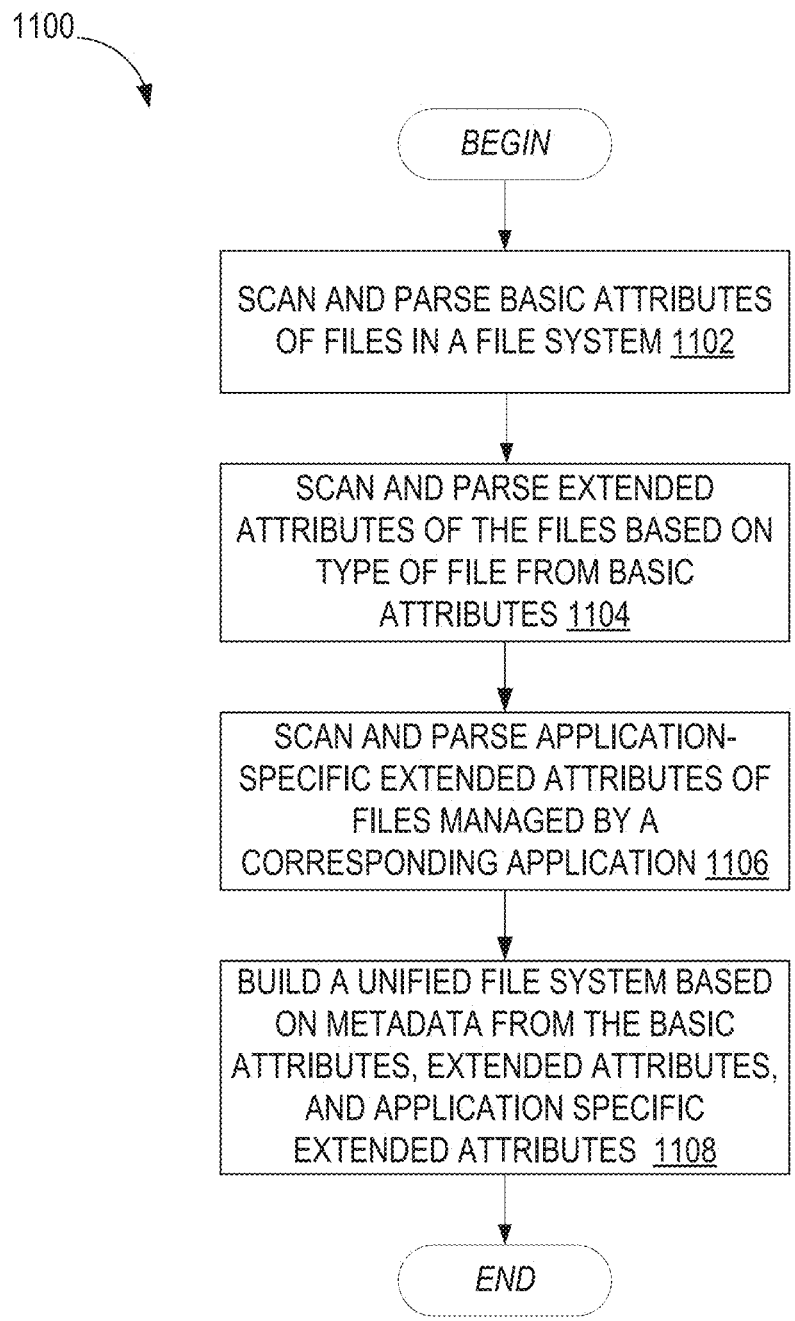
FIG. 11 is a flow diagram of another example embodiment of a method for building a unified file system based on aggregated metadata from disparate sources.

FIG. 11 is a flow diagram of another example embodiment of a method 1100 for building a unified file system based on aggregated metadata from disparate sources. At operation 1102, a unified file system application scans and parses basic attributes of files from a native file system (e.g., local OS file system on a computer). As previously described, examples of basic attributes include a file name, a file type (e.g. extension, such as .doc or .pdf), a file size, a path, and dates. In one example embodiment, operation 1102 may be implemented with the unified file system 702 of FIG. 7.

At operation 1104, the unified file system 702 scans and parses out file-specific metadata based on the types of files identified from the basic attributes. Examples of extended attributes 708 may include ID3 tags for audio and video files, EXIF data for photo and image files, etc. These extended attributes 708 may be embedded in the corresponding files and often provide far more detailed information about the nature of a file and its content. For example, with audio files, additional information in the extended attributes 708 may include the artist of a song, the album the song is on, the release date of the album, which song on the album it is and how many songs there are in total, etc. For photos, additional information in the extended attributes 708 may include the make and model of the camera the photo was shot with, the shutter speed and aperture, white balance, whether the flash was on, if the camera has a GPS tagger it might include the geolocation data of where the photo was shot, etc.

At operation 1106, the unified file system 702 may additionally parse out application-specific extended attributes 710 (e.g., additional extended attributes for all file libraries that are managed within applications). Many files are not at all managed within the standard file system of an operating system, instead they are managed via an application that is dedicated to a given file or media type. For example, documents might simply be put into directories within the basic file system of an operating system; however, music might be managed within a media player, such as Apple's iTunes and photos might be managed within a photo management application like Adobe's Lightroom. In each such case, a variety of application-specific metadata (included in the application-specific extended attributes 710) is generated by such applications in order to organize and manipulate the files. Examples of this might be photos being put into a photo "album", songs being put into a playlist. In many cases, these applications allow files to be rated, indicating which ones are preferred by the user over others.

At operation 1108, by building the unified file system 702 to include these additional sources of information/metadata (from basic attributes 706, extended attributes 708, and application-specific extended attributes 710), the unified metadata 704 is vastly more information-rich than a standard, file system built only from basic attributes. For example, this enables the unified file system 702 to search not only for files across a variety of stored locations and devices (e.g. computers, external hard drives, online services, etc.), but also for detail within those files. Such a search would be traditionally performed by using separate tools (e.g. the operating system to see where on the hard drive a file is, an ID3 tag editor to reveal ID3 tags, iTunes for playlists, Lightroom for EXIF data, etc.) and not the basic search capabilities of the native file system's search functionality. Thus, the unified file system 702 incorporates both native operating system, third party software, and application library searching all from within a single platform.

Figure 12:
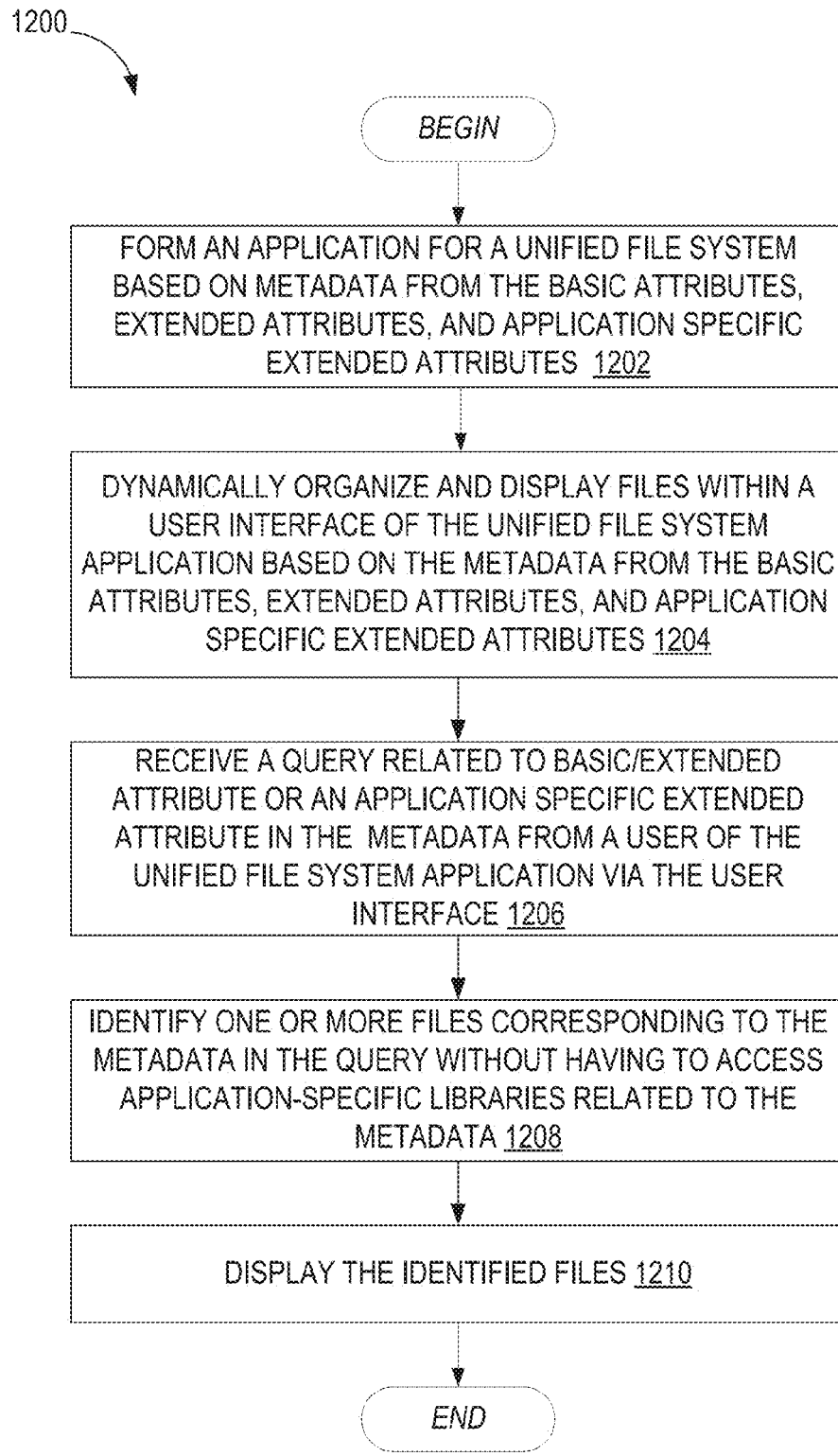
FIG. 12 is a flow diagram of an example embodiment of a method for operating a search query on the unified file system.

FIG. 12 is a flow diagram of an example embodiment of a method 1200 for operating a search query on the unified file system. At 1202, an application may be formed based on the unified file system. For example, a music player application play songs from files identified with the unified file system. At operation 1204, the application may organize and display files within a user interface of the unified file system application based on the unified metadata. Examples of user interfaces are illustrated in FIGS. 15A-15E. At operation 1206, the application may receive a query related to the unified metadata. By unifying disparate data/metadata about files, the unified file system 702 is able to create unique queries not just for files, but for files across many devices. In a sense, this eliminates the need to organize content, because the unified file system 702 can find it all and organize it based on the query. An example of a query would be: "photos of my daughter Gia in Hawaii last year shot with my Canon S110". In this case, the unified filed system 702 knows which files are photos because of their file extension; the camera's GPS tag indicates photos taken in Hawaii; the facial recognition feature in a photo management application (e.g. iPhoto) knows which photos include Gia; EXIF data provides date and what device created the image. These photos can span different devices as well as applications (e.g., iPhoto and Picassa). At operation 1208, the unified filed system 702 identifies one or more files based on the query and the unified metadata without having to access application-specific libraries related to the metadata. Typically, a user would have to open iPhoto and manually browse through photos within the application. If the photo is not found there, the user would have to open Picasa and browse through more photos within the application. At operation 1208, the files are displayed in a user interface of the unified filed system 702 without having to launch iPhoto or Picasa to find and display the photos.

Furthermore, by adding additional third party data, such as a social network application account, a search can instantly create a playlist: "songs released the year I graduated high school". Because the social network application knows the birthday, the unified file system 702 can augment the query for songs using personal information.

Figure 15A:
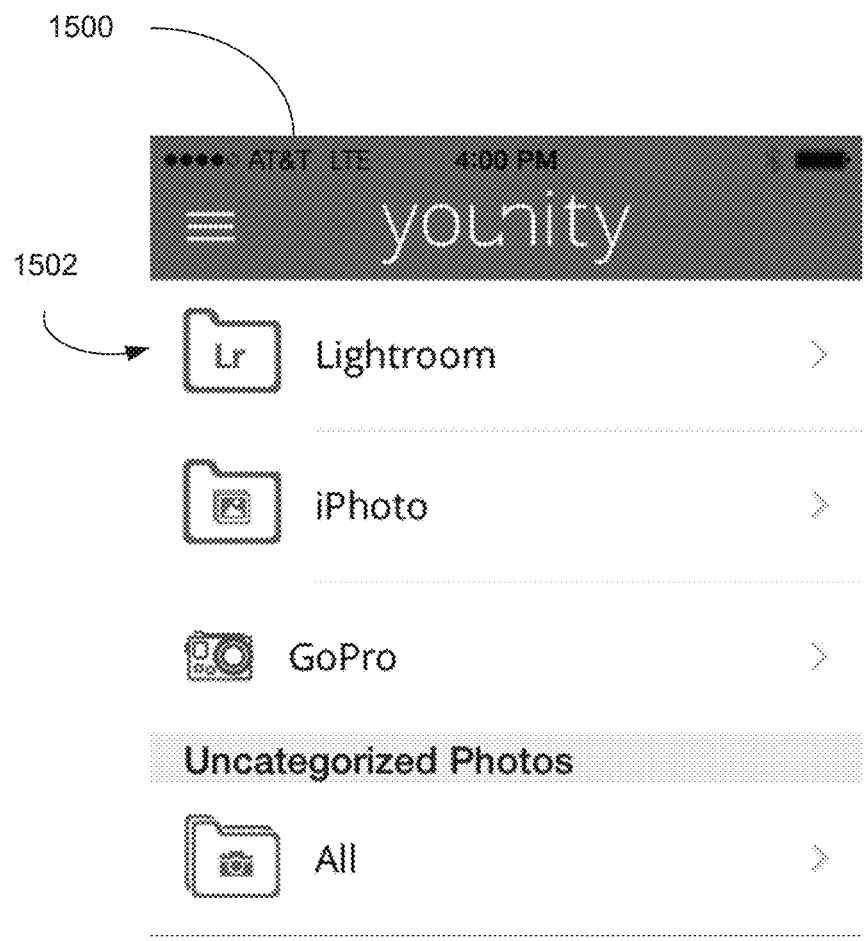
FIGS. 15A-15E are examples of graphical user interface of a unified file system.
Figure 15B:
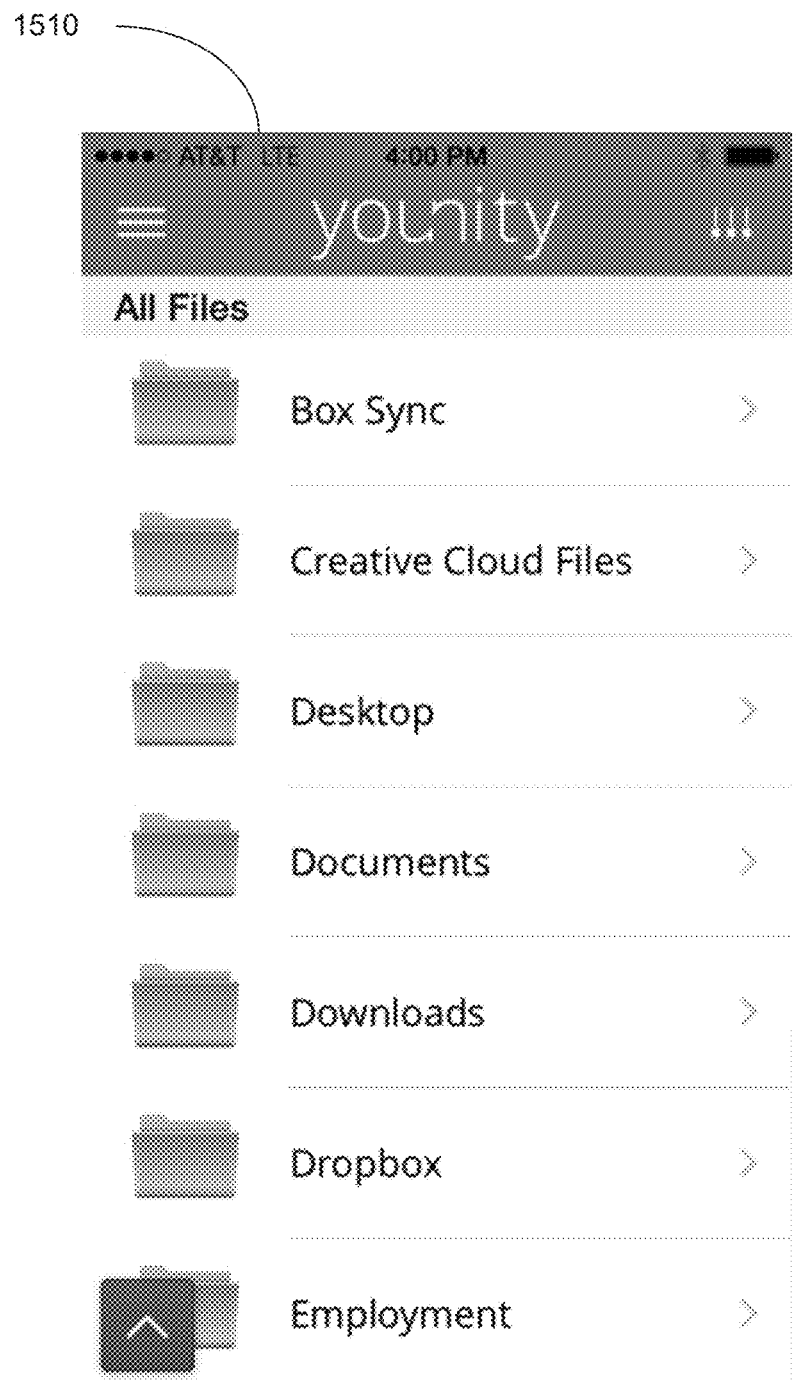
Figure 15C:
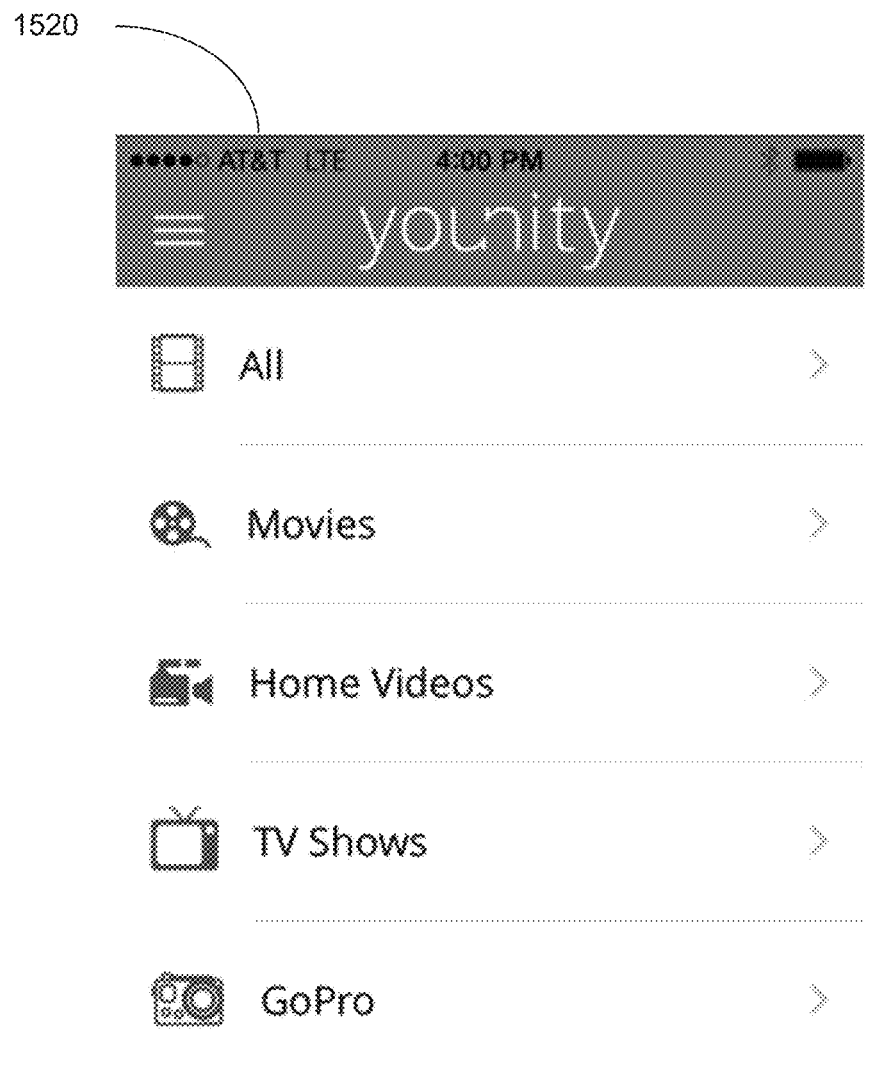
Figure 15D:
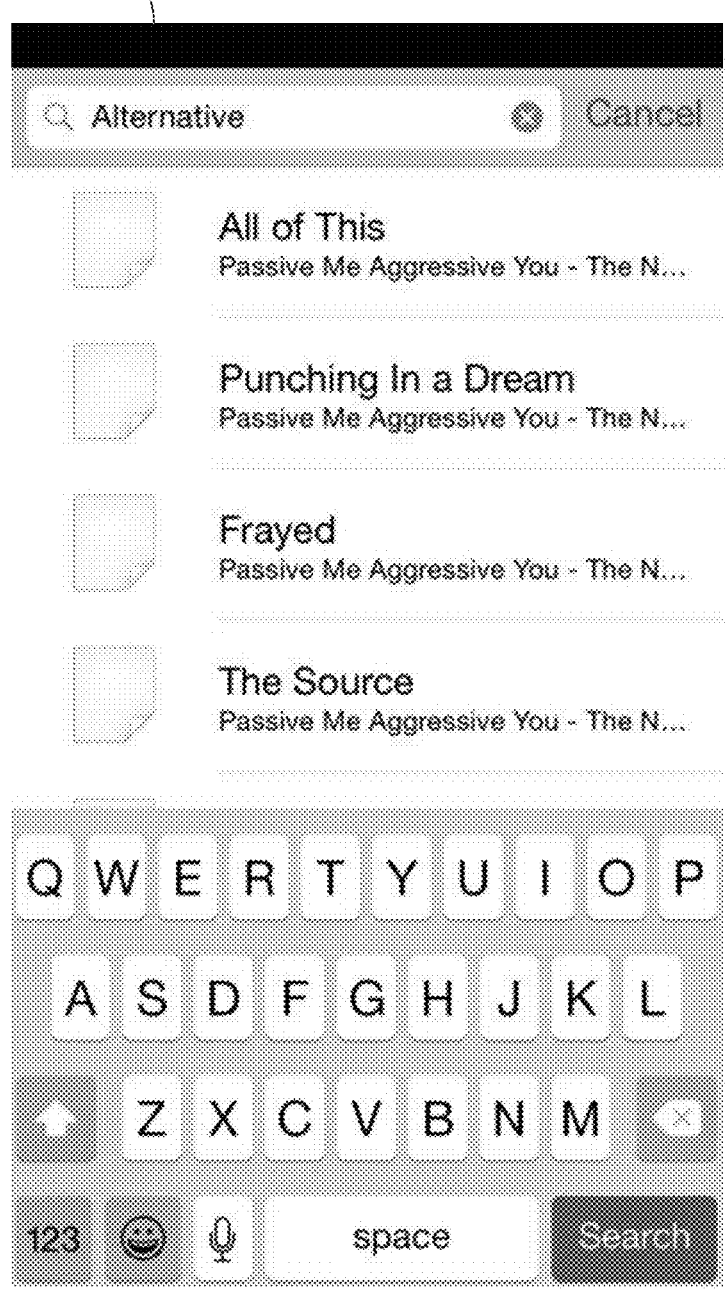
Figure 15E:
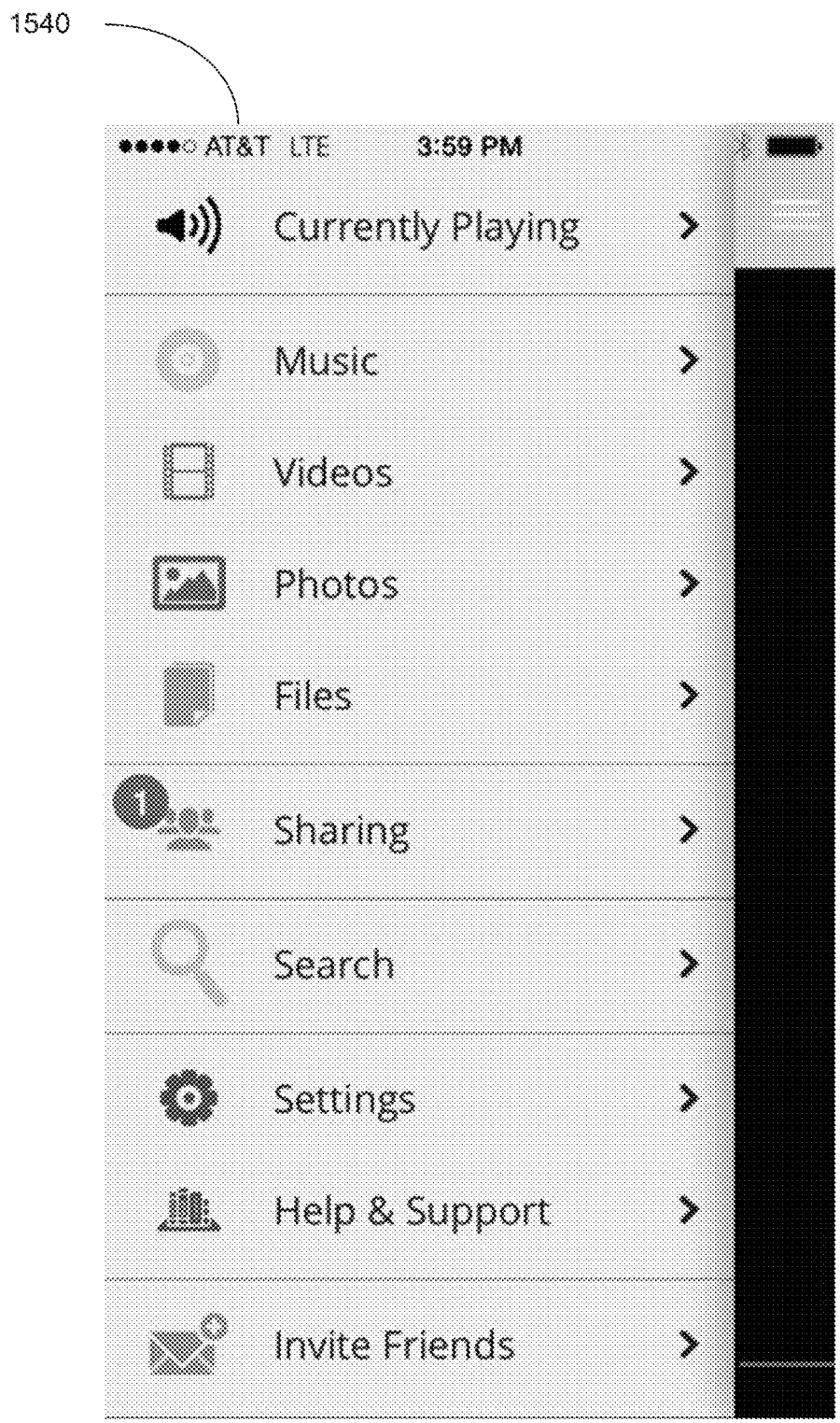

FIGS. 15A-15E are examples of graphical user interface (GUI) of a unified file system. FIG. 15A illustrates a GUI 1500 where files are organized by applications 1502 based on application-specific attributes. FIG. 15B illustrates a GUI 1510 where files are organized by folders from a native file system across devices associated with a user account. FIG. 15C illustrates an example GUI 1500 where files are organized by type of media based on application-specific attributes. FIG. 15D illustrates a GUI 1500 receiving a query and identifying files based on the query using the unified metadata. FIG. 15E illustrates an example GUI 1500 where files are organized by media types based on the unified metadata.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
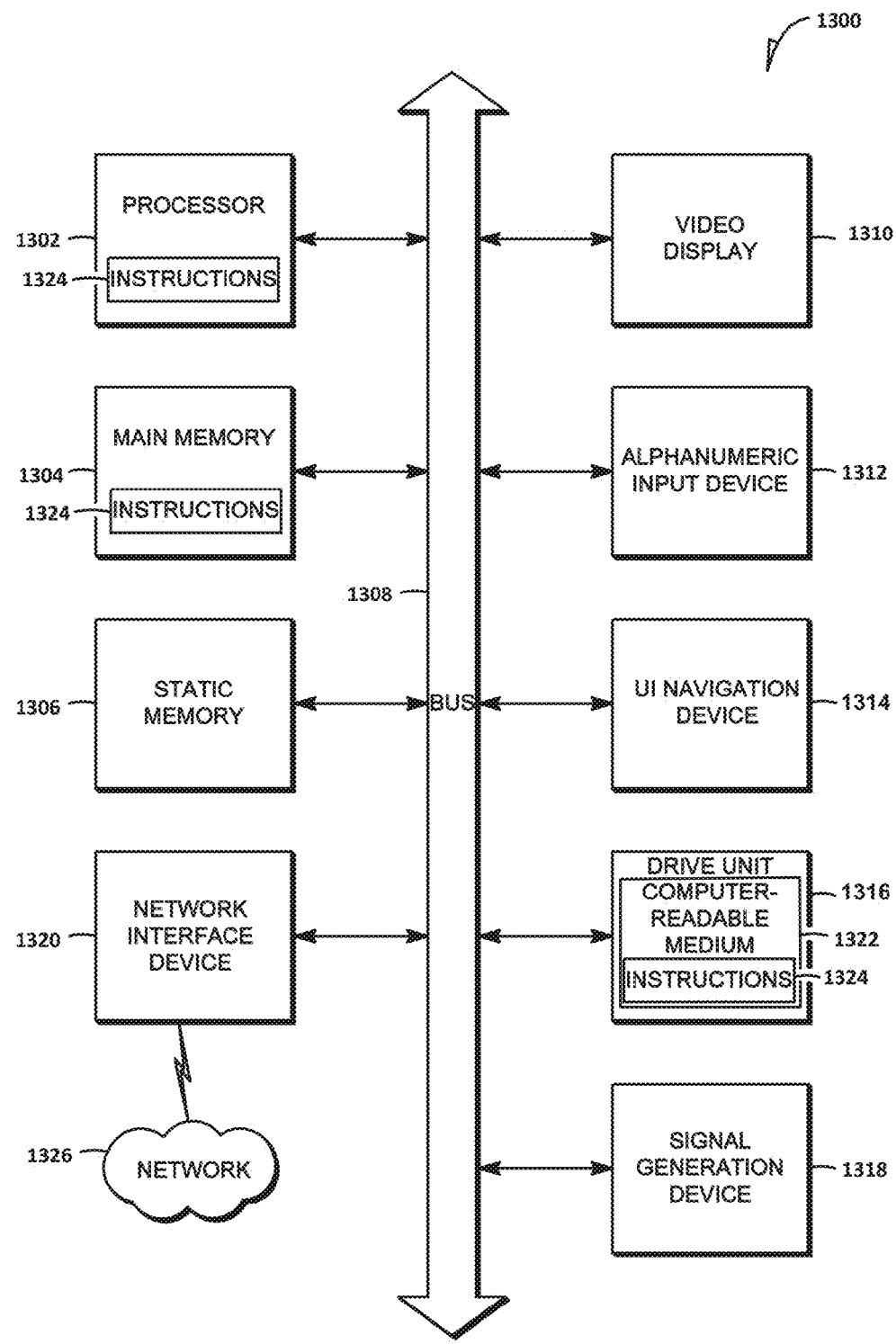
FIG. 13 is a block diagram illustrating components of a machine, according to some example embodiments, able to read instructions from a machine-readable medium and perform any one or more of the methodologies discussed herein.

FIG. 13 is a block diagram of a machine in the example form of a computer system 1300 within which instructions 1324 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation (or cursor control) device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media. The instructions 1324 may also reside, completely or at least partially, within the static memory 1306.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Example Mobile Device

Figure 14:
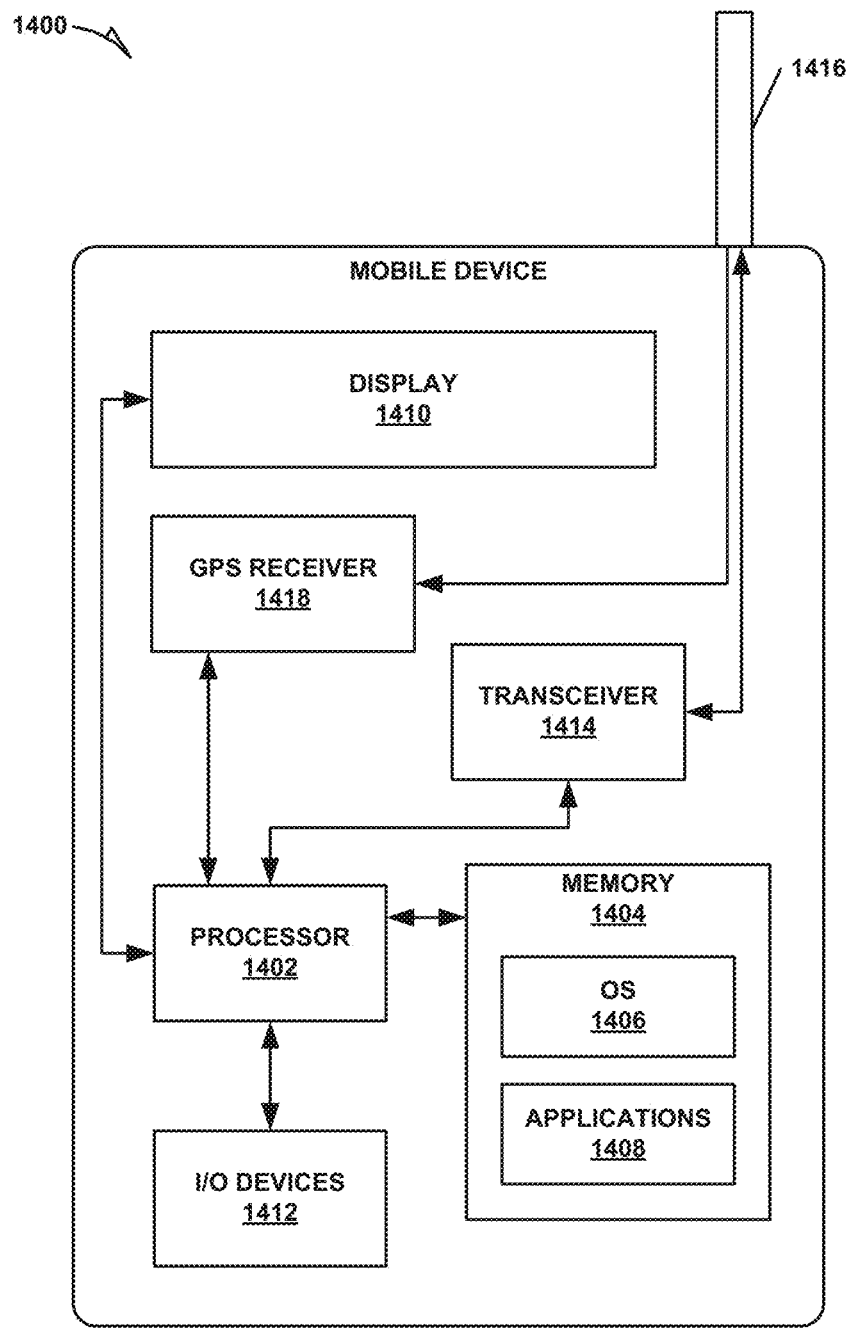
FIG. 14 is a block diagram illustrating a mobile device, according to an example embodiment.

FIG. 14 is a block diagram illustrating a mobile device 1400, according to an example embodiment. The mobile device 1400 may include a processor 1402. The processor 1402 may be any of a variety of different types of commercially available processors 1402 suitable for mobile devices 1400 (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as application programs 1408, such as a mobile location enabled application that may provide LBSs to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
  a storage device configured to store a file system; and
  a unified file system application, implemented by a hardware processor, the unified file system application configured to:
  identify basic attributes of files in the file system;
  identify extended attributes of the files in the file system;
  identify application-specific attributes of the files that are managed by corresponding applications in the file system;
  generate an aggregate metadata library for the files in the file system based on the basic attributes, extended attributes, and application-specific attributes;
  form a unified file system based on the aggregate metadata library; and
  propagate the aggregate metadata library to other registered peer devices, the devices configured to store the aggregate metadata library from all other registered peer devices, and other aggregate metadata library from other registered peer devices.

2. The device of claim 1, wherein the unified file system application is configured to:
  receive a query on the unified file system; and
  identify one or more files from the unified file system based on the query and metadata from the aggregate metadata library.

3. The device of claim 2, wherein the unified file system application is configured to:
  cause a display of the one or more files in a user interface of the unified file system application.

4. The device of claim 2, wherein the unified file system application is configured to:

access the identified one or more files with an application of the file system corresponding to the identified one or more files from the unified file system based on the aggregate metadata library.

5. The device of claim 1, wherein the unified file system application is configured to store the aggregate metadata library in the storage device of the device.

6. The device of claim 1, wherein the unified file system application is configured to communicate the aggregate metadata library to a second device having a second unified system application and a second aggregate metadata library.

7. The device of claim 1, wherein the basic attributes comprise operating system file system attributes, the operating system file system attributes comprising at least one of a file name, a file type, a file size, a file creation date, and a file path in the file system.

8. The device of claim 1, wherein the extended attributes comprise file metadata, the file metadata comprising at least one of audio file tag attributes, and image file attributes.

9. The device of claim 1, wherein the application-specific attributes of the files include metadata generated by one or more applications in the file system.

10. A method comprising:
storing a file system in a storage device;
identifying, using a unified file system application implemented in a hardware processor, basic attributes of files in the file system;
identifying extended attributes of the files in the file system;
identifying application-specific attributes of the files that are managed by corresponding applications in the file system;
generating an aggregate metadata library for the files in the file system based on the basic attributes, extended attributes, and application-specific attributes;
forming a unified file system based on the aggregate metadata library; and
propagating the aggregate metadata library to all registered peer devices, and other aggregate metadata library from other registered peer devices.

11. The method of claim 10, further comprising:
receiving a query on the unified file system; and
identifying one or more files from the unified file system based on the query and metadata from the aggregate metadata library.

12. The method of claim 11, further comprising:
causing a display of the one or more files in a user interface of the unified file system application.

13. The method of claim 11, further comprising:
accessing the identified one or more files with an application of the file system corresponding to the identified one or more files from the unified file system based on the aggregate metadata library.

14. The method of claim 10, further comprising:
storing the aggregate metadata library in the storage device of a device.

15. The method of claim 10, further comprising:
communicating the aggregate metadata library to a second device having a second unified system application and a second aggregate metadata library.

16. The method of claim 10, wherein the basic attributes comprise operating system file system attributes, the operating system file system attributes comprising at least one of a file name, a file type, a file size, a file creation date, and a file path in the file system,
wherein the extended attributes comprise file metadata, the file metadata comprising at least one of audio file tag attributes, and image file attributes, and
wherein the application-specific attributes of the files include metadata generated by one or more applications in the file system.

17. A non-transitory machine-readable storage medium comprising instructions that, when executed by one or more processors of a machine, cause the machine to perform operations comprising:
storing a file system in a storage device;
identifying, using a unified file system application implemented in a hardware processor, basic attributes of files in the file system;
identifying extended attributes of the files in the file system;
identifying application-specific attributes of the files that are managed by corresponding applications in the file system;
generating an aggregate metadata library for the files in the file system based on the basic attributes, extended attributes, and application-specific attributes;
forming a unified file system based on the aggregate metadata library; and
propagating the aggregate metadata library to all registered peer devices, and other aggregate metadata library from other registered peer device.

18. The non-transitory machine-readable medium of claim 17, wherein the operations further comprise:
receiving a query on the unified file system;
identifying one or more files from the unified file system based on the query and metadata from the aggregate metadata library;
causing a display of the one or more files in a user interface of the unified file system application; and
accessing the identified one or more files with an application of the file system corresponding to the identified one or more files from the unified file system based on the aggregate metadata library.

* * * * *